United States Patent
Tsunoda et al.

(10) Patent No.: US 9,494,360 B2
(45) Date of Patent: Nov. 15, 2016

(54) AIR CONDITIONER FOR VEHICLE

(71) Applicant: HONDA MOTOR CO., LTD., Minato-Ku, Toyko (JP)

(72) Inventors: Isao Tsunoda, Utsunomiya (JP); Kazuma Ichikawa, Haga-Gun (JP)

(73) Assignee: Honda Motor Co., Ltd., Tokyo (JP)

( * ) Notice: Subject to any disclaimer, the term of this patent is extended or adjusted under 35 U.S.C. 154(b) by 511 days.

(21) Appl. No.: 13/893,690

(22) Filed: May 14, 2013

(65) Prior Publication Data
US 2013/0305759 A1    Nov. 21, 2013

(30) Foreign Application Priority Data

May 21, 2012    (JP) .................................. 2012-115561
May 21, 2012    (JP) .................................. 2012-115564

(51) Int. Cl.
*F25D 21/06*    (2006.01)
*F25D 21/00*    (2006.01)
(Continued)

(52) U.S. Cl.
CPC ......... *F25D 21/004* (2013.01); *B60H 1/00921* (2013.01); *B60H 1/321* (2013.01); *F25B 47/022* (2013.01)

(58) Field of Classification Search
CPC ............ F25D 21/004; B60H 1/00899; B60H 1/00914; B60H 1/00921; B60H 1/321; F25B 47/022
USPC .......................................... 62/151, 197, 244
See application file for complete search history.

(56) References Cited

U.S. PATENT DOCUMENTS 6,314,750 B1 *  11/2001  Ishikawa ............ B60H 1/00921
                                                            62/129

FOREIGN PATENT DOCUMENTS

| CN | 2497237 Y | 6/2002 |
|---|---|---|
| CN | 101743449 A | 6/2010 |

(Continued)

OTHER PUBLICATIONS

The partial European Search Report, dated Mar. 7, 2013, issued in corresponding EP application 13167757.7-1756.
(Continued)

*Primary Examiner* — Marc Norman
(74) *Attorney, Agent, or Firm* — Carrier Blackman & Associates, P.C.; William D. Blackman; Jingli Wang

(57) ABSTRACT

An air conditioner for a vehicle is provided with: a compressor that compresses a heat exchange medium; an external heat exchanger that receives the heat exchange medium and that exchanges heat with the outside of a vehicle compartment; and an evaporator that receives the heat exchange medium and exchanges heat with the inside of a vehicle compartment, and the air conditioner for a vehicle is able to perform: a defrosting cooling operation in which the heat exchange medium that has been compressed by the compressor is made to flow into the evaporator and absorb heat, and to then flow into the external heat exchanger and release heat; and a hot gas operation in which the heat exchange medium that has been compressed by the compressor is made to flow into the external heat exchanger and release heat without being made to absorb heat in the evaporator, and, by switching between performing the defrosting cooling operation and performing the hot gas operation, the air conditioner for a vehicle performs a defrosting operation in which the external heat exchanger is defrosted.

1 Claim, 13 Drawing Sheets

(51) Int. Cl.
*B60H 1/00* (2006.01)
*B60H 1/32* (2006.01)
*F25B 47/02* (2006.01)

(56) References Cited

FOREIGN PATENT DOCUMENTS

| CN | 202153068 U | 2/2012 |
|---|---|---|
| DE | 10 2011 100 198 A1 | 11/2011 |
| FR | 2 964 910 A1 | 3/2012 |
| JP | H01153481 U | 10/1989 |
| JP | 05-310034 A | 11/1993 |
| JP | H071953 A | 1/1995 |
| JP | 11-257719 A | 9/1999 |
| JP | 2000035265 A | 2/2000 |
| JP | 2000-343934 A | 12/2000 |
| JP | 2001246930 A | 9/2001 |
| JP | 2004-205073 A | 7/2004 |
| JP | 2004-245479 A | 9/2004 |
| JP | 2008075261 A | 4/2008 |
| JP | 2010-236709 A | 10/2010 |
| JP | 2012-030734 A | 2/2012 |
| JP | 2012030603 A | 2/2012 |
| WO | 2012/060132 A1 | 5/2012 |

OTHER PUBLICATIONS

Extended European search report dated Oct. 9, 2013 issued in corresponding application.
Japanese Office Action, Notice of Rejection, with a mailing date of Sep. 30, 2014, issued in the corresponding JP Patent Application 2012-115561, with the English translation thereof.
Japanese Office Action issued in the corresponding JP Patent Application 2012-115561 with a mailing date of Mar. 25, 2014, and the English translation thereof.
Office Action mailed Jan. 12, 2015 corresponding to Chinese Patent Application 201310187138.2 with partial English translation.
Office Action mailed Aug. 18, 2015 for corresponding Japanese Patent Application No. 2012-115564.
Office Action mailed Sep. 25, 2015 for corresponding Chinese Patent Application No. 201310187138.2.
Office Action mailed Feb. 23, 2016 for Japanese Application No. 2012-115564.

* cited by examiner

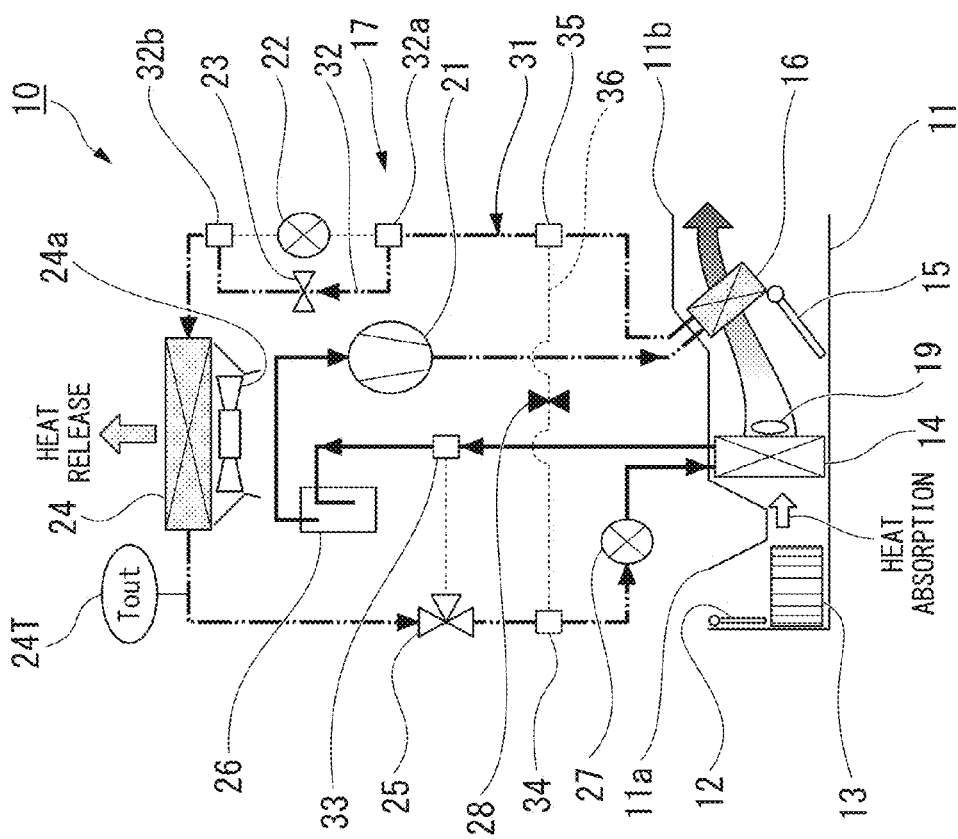
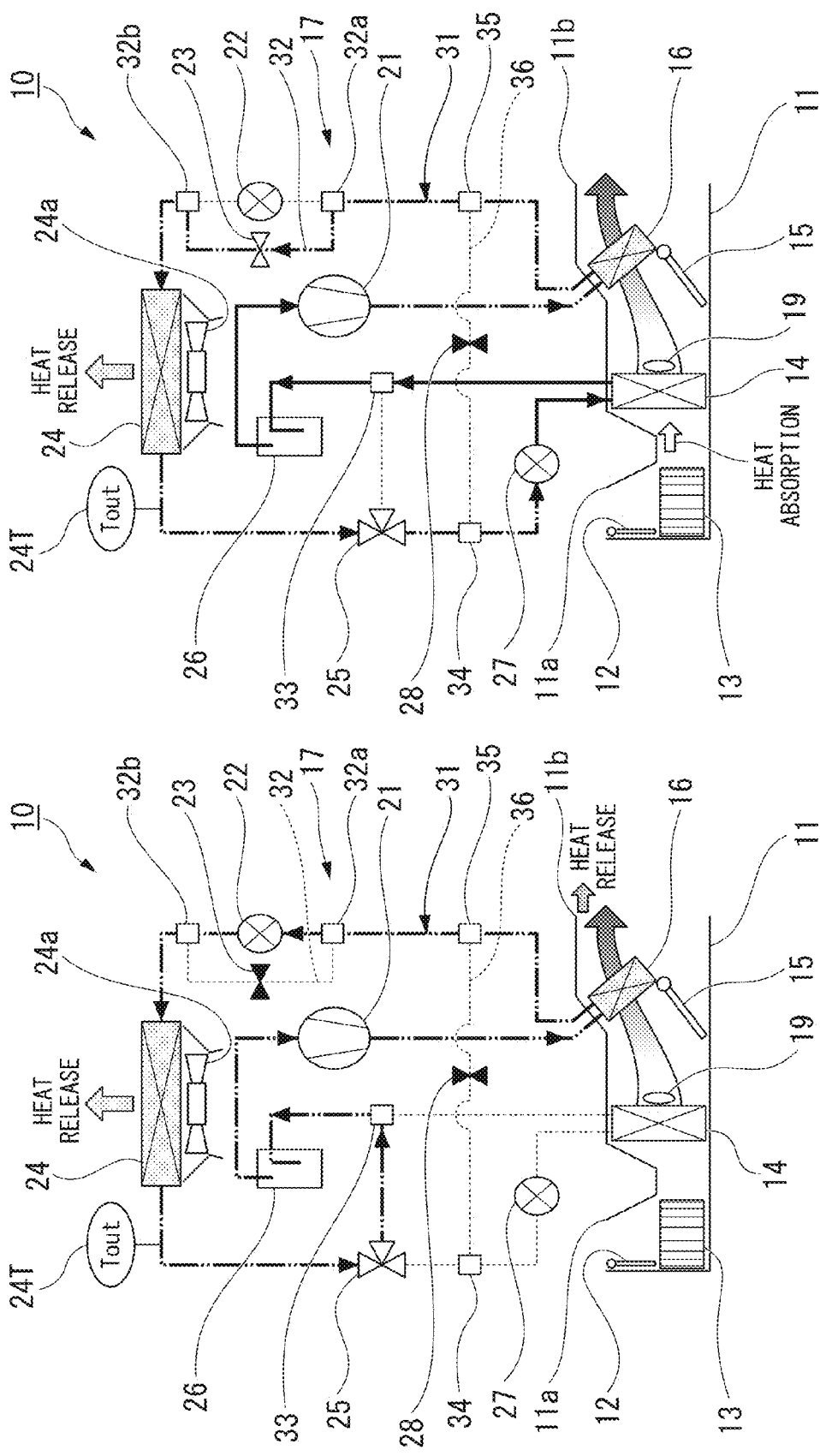
FIG. 4A
FIG. 4B

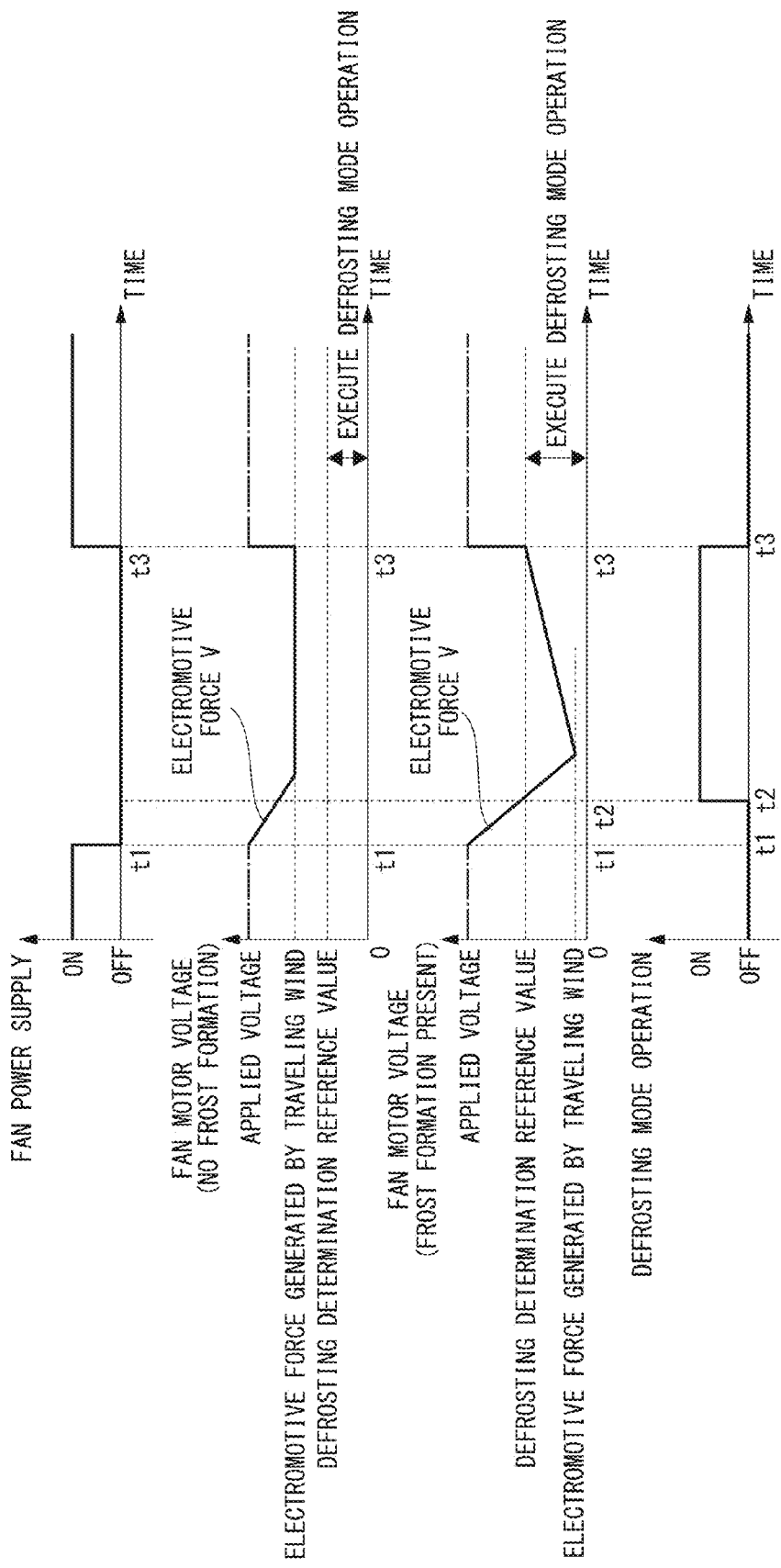

AIR CONDITIONER FOR VEHICLE

Priority is claimed on Japanese Patent Application No. 2012-115561, filed May 21, 2012 and Japanese Patent Application No. 2012-115564, filed May 21, 2012, the contents of which are incorporated herein by reference.

BACKGROUND OF THE INVENTION

Field of the Invention

The present invention relates to an air conditioner for a vehicle.

Description of Related Art

In electric vehicles, because the engine cooling water cannot be used to heat the vehicle interior, an air conditioner for a vehicle that utilizes a heat pump cycle is employed (see, for example, Japanese Unexamined Patent Application Publication (JP-A) Nos. 5-310034 and 2000-343934). In addition to a compressor, this air conditioner for a vehicle is provided with a heating expansion valve and an external heat exchanger, and also with a cooling expansion valve and an internal heat exchanger.

During a warming operation, a heat exchange medium that has been compressed by the compressor is expanded by the heating expansion valve, and flows into the external heat exchanger. As a consequence, the heat exchange medium absorbs heat via the external heat exchanger, and then releases this heat in the internal heat exchanger so as to warm the interior of the vehicle compartment.

During a cooling operation, a heat exchange medium that has been compressed by the compressor is expanded by the cooling expansion valve, and flows into the internal heat exchanger. As a consequence, the heat exchange medium absorbs heat in the internal heat exchanger so as to cool the interior of the vehicle compartment, and then releases this heat in the internal heat exchanger.

In this air conditioner for a vehicle, because the heat exchange medium absorbs heat during a warming operation in the external heat exchanger, if the external temperature is extremely low, then in some cases, frost formation may occur on the surface of the external heat exchanger. If frost formation does occur, then because the heat transfer rate deteriorates so that the heat absorption is inadequate, the problem arises that the warming effect inside the vehicle compartment is insufficient.

Note that, during a cooling operation, because heat is released in the external heat exchanger, performing an operation to defrost the external heat exchanger by switching from a warming operation to a cooling operation may be considered. However, in a defrosting operation that requires this type of cooling operation to be performed, cold air is supplied to the vehicle interior so that it becomes extremely uncomfortable for occupants of the vehicle.

Therefore, in the technology disclosed in Japanese Unexamined Patent Application Publication (JP-A) Nos. 5-310034 and 2000-343934, an operation to defrost the external heat exchanger is performed using hot gas. In this defrosting operation, the heat exchange medium (i.e., the hot gas) that has been compressed by a compressor bypasses the expansion valve before flowing into the external heat exchanger. Because this heat exchange medium is able to release heat without absorbing heat in the external heat exchanger, it is able to defrost the external heat exchanger. Moreover, because it also does not absorb heat in the internal heat exchanger as well, cold air is not supplied to the vehicle interior.

Moreover, conventionally, an air conditioner for a vehicle is known that, for example, in an air conditioner that performs a defrosting mode operation using a heat pump cycle, is provided with a temperature sensor that detects the surface temperature of the external heat exchanger, and determines whether or not the external heat exchanger is in a frosted state based on the detection value of the surface temperature of the external heat exchanger, and then performs a defrosting mode operation based on the result of this determination (see, for example, Japanese Unexamined Patent Application Publication (JP-A) No. 2010-236709).

SUMMARY OF THE INVENTION

However, in a defrosting operation that uses hot gas, because the hot gas is generated by the heat generated by the compressor itself being transmitted to the heat exchange medium, the problems arise that the power consumption of the compressor is increased, and a considerable length of time is needed until the frost begins to melt.

Moreover, according to the air conditioner for a vehicle of the above-described conventional technology, if it is detected that the surface temperature of the external heat exchanger has dropped to a predetermined temperature or less, the external heat exchanger is determined to be in a frosted state and a defrosting mode operation is executed.

However, in actuality, it is difficult to accurately determine whether or not the external heat exchanger is in a frosted state solely from the surface temperature of the external heat exchanger, and in order to ensure a desired determination accuracy, there is a possibility that a determination that is based on an enormous amount of actual measurement data that will have to be obtained by combining a plurality of other parameters such as, for example, the outside air temperature and the vehicle speed and the like will be needed.

Moreover, if the defrost mode operation is executed based solely on information of temperature such as the surface temperature of the external heat exchanger, then if, in actual fact, the external heat exchanger is not in a frosted state, or if the external heat exchanger is in a frosted state but the performance of the external heat exchanger has not deteriorated, then there is a possibility that the defrosting mode operation will be executed excessively frequently.

It is an object of an aspect of the present invention to provide an air conditioner for a vehicle that is capable of performing efficient defrosting within a short space of time.

It is a further object of the present invention to provide an air conditioner for a vehicle that is able to execute a defrosting mode operation at suitable timings and frequencies.

In the air conditioner for a vehicle according to an aspect of the present invention, the following structures are employed in order to achieve the aforementioned objects.

(1) The air conditioner for a vehicle according to one aspect of the present invention is provided with: a compressor that compresses a heat exchange medium; an external heat exchanger that receives the heat exchange medium and that exchanges heat with the outside of a vehicle compartment; and an internal heat exchanger that receives the heat exchange medium and exchanges heat with the inside of a vehicle compartment, wherein the air conditioner for a vehicle is able to perform: a cooling operation in which the heat exchange medium that has been compressed by the compressor is made to flow into the internal heat exchanger and absorb heat, and to then flow into the external heat exchanger and release heat; and a hot gas operation in which the heat exchange medium that has been compressed by the compressor is made to flow into the external heat exchanger and release heat without being made to absorb heat in the internal heat exchanger, and, by switching between performing the cooling operation and performing the hot gas operation, the air conditioner for a vehicle performs a defrosting operation in which the external heat exchanger is defrosted.

(2) The air conditioner for a vehicle according to another aspect of the present invention is provided with: a compressor that compresses and outputs a heat exchange medium; an internal condenser that is able to release heat using the heat exchange medium that has been output from the compressor after being compressed; an external heat exchanger that exchanges heat between the heat exchange medium output from the internal condenser and an atmosphere outside a vehicle compartment; an internal heat exchanger that exchanges heat between the heat exchange medium and an atmosphere inside the vehicle compartment; an air blower that is able to blow air into the external heat exchanger and that is able to generate power by receiving wind that passes through the external heat exchanger; an electromotive force sensor that detects an electromotive force of the air blower; a vehicle speed sensor that detects a vehicle speed; and a control device that controls a defrosting mode operation in which the external heat exchanger is defrosted, wherein the control device determines whether or not frost formation has occurred on the external heat exchanger based on the electromotive force detected by the electromotive force sensor when the supply of power to the air blower has been stopped and on the vehicle speed detected by the vehicle speed sensor, and when it determines that frost formation has occurred on the external heat exchanger based on the results of the foregoing determination, begins to execute the defrosting mode operation.

(3) In the above-described aspect (2), it is also possible for the control device to determine whether or not frost formation has occurred on the external heat exchanger based on the electromotive force detected by the electromotive force sensor while the defrosting mode operation is being executed and on the vehicle speed detected by the vehicle speed sensor, and when it determines that frost formation has not occurred on the external heat exchanger based on the results of the foregoing determination, for it to stop the defrosting mode operation.

According to the above-described aspect (1), because a defrosting operation is performed by switching between a cooling operation in which heat is absorbed by an internal heat exchanger and a hot gas operation in which heat is not absorbed by the internal heat exchanger, it is possible to limit the amount of cold air that supplied to the vehicle interior compared with when a defrosting operation is performed solely via a cooling operation.

Moreover, in a cooling operation in which heat that has been absorbed is then released, compared with a hot gas operation in which heat is released without first having to be absorbed, a greater amount of heat can be released. As a consequence, compared with when a defrosting operation is performed solely via a hot gas operation, it is possible to defrost an external heat exchanger both efficiently and in a short space of time.

According to the above-described aspect (2), by comparing the electromotive force of the air blower, which corresponds to a previously ascertained vehicle speed, with the electromotive force actually generated in the air blower, it is possible to detect the extent of the reduction in the travelling wind speed of the external heat exchanger. By then using these detection results to determine whether or not frost formation has occurred on the external heat exchanger, and starting to execute a defrosting mode operation when it is determined that frost formation has occurred, the defrosting mode operation can be executed at suitable timings and frequencies.

As a consequence, if the external heat exchanger is not actually in a frosted state, or if the external heat exchanger is in a frosted state but the performance of the external heat exchanger has not deteriorated, the defrosting mode operation is prevented from being executed excessively frequently.

According to the above-described aspect (3), when a defrosting mode operation is being executed, by comparing the electromotive force of the air blower, which corresponds to a previously ascertained vehicle speed, with the electromotive force actually generated in the air blower, it is possible to detect whether or not the travelling wind speed of the external heat exchanger, which has been reduced by frost formation, has recovered.

By using these detection results to determine whether or not frost formation has occurred on the external heat exchanger, and halting a defrosting mode operation when it is determined that frost formation has not occurred, the defrosting mode operation can be stopped at suitable timings.

BRIEF DESCRIPTION OF THE DRAWINGS

FIG. 4A is a view showing a hot gas operating state, which is also a state of a defrosting operation of the air conditioner for a vehicle.

FIG. 4B is a view showing a cooling operating state for performing defrosting, which is also a state of a defrosting operation of the air conditioner for a vehicle.

FIG. 14 is a view showing an example of changes when a fan power supply is turned on and off, and in the electromotive force of the fan motor, and when a defrosting mode operation is turned on and off in the air conditioner for a vehicle according to another embodiment of the present invention.

DESCRIPTION OF THE EMBODIMENTS

Hereinafter, an air conditioner for a vehicle according to an embodiment of the present invention will be described with reference made to the appended drawings (FIG. 1 through FIG. 8).

(Air Conditioner for a Vehicle)

An air conditioner for a vehicle 10 according to the present embodiment is mounted, for example, in an electric vehicle 1 that is not equipped with an internal combustion engine as its vehicle drive source, and is able to execute a dehumidification warming mode operation by means of a heat pump cycle.

Figure 1:
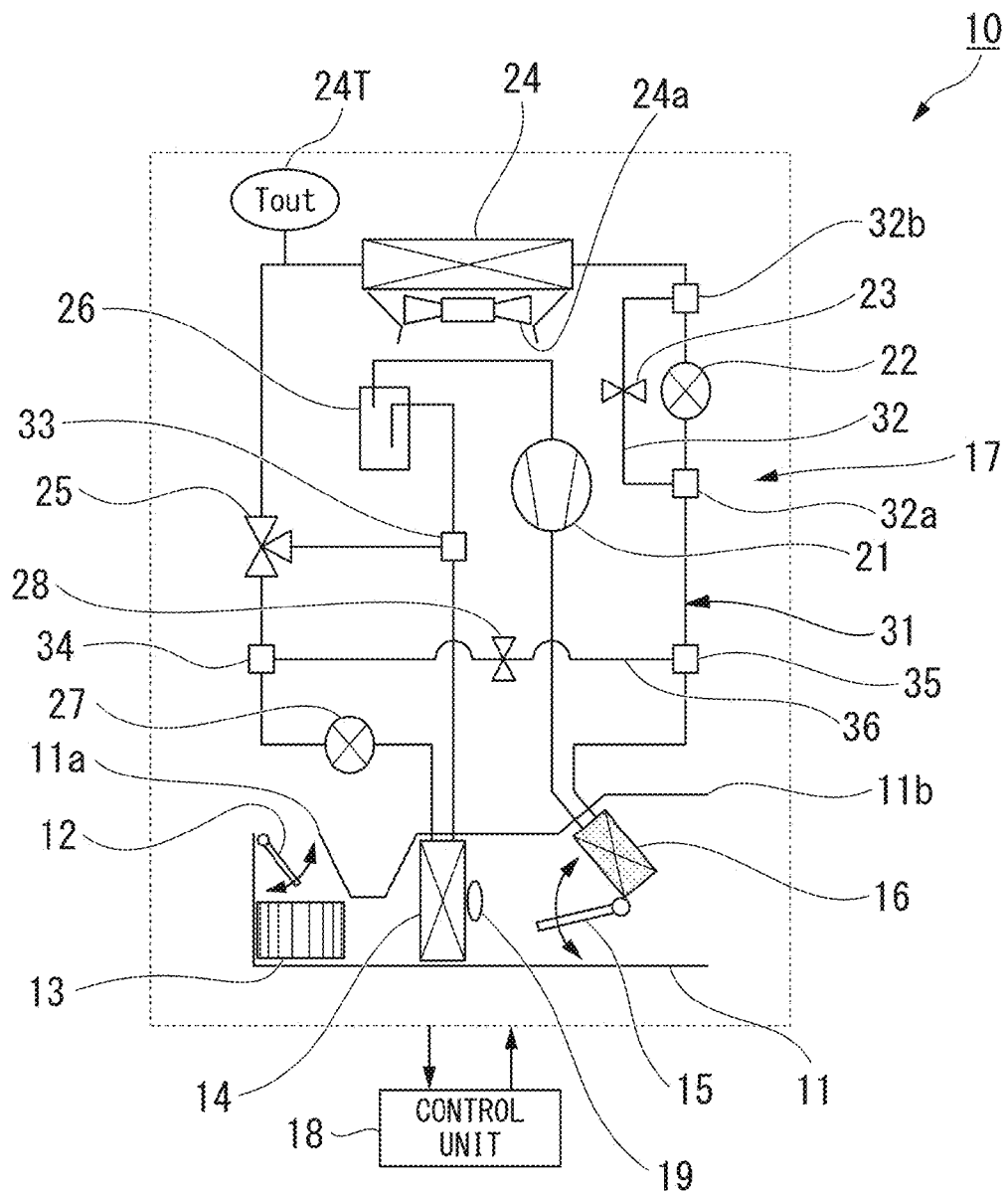
FIG. 1 is a structural view of an air conditioner for a vehicle according to an embodiment of the present invention.

As is shown in FIG. 1, the air conditioner for a vehicle 10 is provided with an intake port opening/closing door 12, an air blower 13, an evaporator 14, a damper 15, and an internal condenser 16 that are provided in this sequence running from an air intake port 11a, which is provided on the upstream side of a ventilation duct 11, towards an air diffuser port 11b, which is provided on the downstream side thereof.

Furthermore, the air conditioner for a vehicle 10 is also provided with a heat pump cycle 17, which is provided with the evaporator 14 and the internal condenser 16, a control unit 18 (i.e., a control device), and an evaporator sensor 19.

The air intake port 11a of the ventilation duct 11 is provided such that it is able to introduce internal air (i.e., air inside the vehicle compartment) and external air (i.e., air outside the vehicle) into the interior of the air conditioner for a vehicle 10.

The air diffuser port 11b of the ventilation duct 11 is provided such that it is able to blow air from inside the air conditioner for a vehicle 10 into the vehicle interior.

The opening and closing of the intake port opening/closing door 12 is controlled, for example, via the control of the control unit 18, and is provided such that it is able to alter the amounts of internal air (i.e., air from inside the vehicle compartment) and external air (i.e., air from outside the vehicle) that are introduced into the interior of the ventilation duct 11.

The air blower 13 is driven in accordance with a drive voltage that is applied, for example, via the control of the control unit 18, and blows air (i.e., both internal air and external air) that has been introduced through the air intake port 11a from the upstream side of the ventilation duct 11 towards the air diffuser port 11b on the downstream side thereof, namely, towards the evaporator 14 and the internal condenser 16.

The evaporator (i.e., the internal heat exchanger) 14 performs heat exchanges between a low-pressure heat exchange medium that has been supplied to the interior thereof and the atmosphere inside the vehicle compartment, and, for example, cools the air that is passing through the evaporator 14 inside the ventilation duct 11 via the heat absorption that occurs when the heat exchange medium evaporates.

The damper 15 is able to be rotated, for example, by a motor (not shown) that is driven by the control of the control unit 18, and the air volume ratio of the air that is passed through the evaporator 14 by the action of the blower 13 is adjusted by the opening angle thereof (for example, the opening angle relative to the ventilation path heading towards the internal condenser 16) between the volume of air that is directed towards the internal condenser 16, and the volume of air that bypasses the internal condenser 16 and is discharged into the vehicle interior.

The internal condenser 16 is able to release heat using the high-temperature, high-pressure heat exchange medium that has been supplied to the interior thereof, and, for example, heats air that is introduced through the interior of the ventilation duct 11 into the internal condenser 16.

The heat pump cycle 17 is provided, for example, with a compressor 21, the internal condenser 16, a heating expansion valve 22, a cooling electromagnetic valve 23, and external heat exchanger 24, a three-way valve 25, a gas-liquid separator 26, a cooling expansion valve 27, and a dehumidification electromagnetic valve 28.

The compressor 21 is driven, for example, by drive force from a motor (not shown) that is driven by the control of the control unit 18, and suctions in a gas phase heat exchange medium from the gas-liquid separator 26. The compressor 21 then compresses this heat exchange medium, and expels the high-temperature, high-pressure heat exchange medium to the internal condenser 16.

The internal condenser 16 is connected by a first flow path 31 to the external heat exchanger 24, and the heating expansion valve 22 and the cooling electromagnetic valve 23 are placed in parallel on the first flow path 31 between the internal condenser 16 and the external heat exchanger 24.

The heating expansion valve 22 is what is known as a diaphragm valve, and it expands the heat exchange medium that has been discharged from the internal condenser 16, and then expels the heat exchange medium, which is at a low temperature and low-pressure and is in a two-phase gas-liquid spray state, into the external heat exchanger 24.

The cooling electromagnetic valve 23 is provided on a bypass flow path 32 that bypasses the heating expansion valve 22 via a first branching pipe 32a, which is on the internal condenser 16 side, and a second branching pipe 32b, which is on the external heat exchanger 24 side, between the internal condenser 16 and the external heat exchanger 24, and opening and closing actions thereof are controlled, for example, by the control unit 18.

For example, the cooling electromagnetic valve 23 is set to a closed state when either a warming mode operation or a dehumidification warming mode operation is being executed, and is set to an open state when a cooling mode operation is being executed. As a consequence of this, when, for example, a warming mode operation or a dehumidification warming mode operation is being executed, the heat exchange medium that is discharged from the internal condenser 16 passes through the heating expansion valve 22 and flows in a low-temperature, low-pressure state into the external heat exchanger 24.

When, on the other hand, a cooling mode operation is being executed, the heat exchange medium discharged from the internal condenser 16 passes through the cooling electromagnetic valve 23 and flows in a high-temperature state into the external heat exchanger 24.

The external heat exchanger 24 is, for example, an externally located condenser, and performs heat exchanges between the heat exchange medium that is circulating inside it and the atmosphere outside the vehicle. A discharge port temperature sensor 24T that measures the temperature of the heat exchange medium flowing out from the discharge port of the external heat exchanger 24 is provided on the downstream side of the external heat exchanger 24.

For example, when a warming mode operation or a dehumidification warming mode operation is being executed, the external heat exchanger 24 is able to absorb heat from the atmosphere outside the vehicle using the low-temperature, low-pressure heat exchange medium that is flowing inside it, and, for example, raises the temperature of the heat exchange medium via the heat absorbed from the atmosphere outside the vehicle.

In contrast, when the cooling mode operation is being executed, the external heat exchanger 24 is able to release heat to the atmosphere outside the vehicle via the high-temperature heat exchange medium that is flowing inside it, and, for example, cools the heat exchange medium by means of this heat release to the atmosphere outside the vehicle and by ventilation air supplied from a condenser fan 24a.

The three-way valve 25 is connected to the external heat exchanger 24, to a junction pipe 33 located on the gas-liquid separator 26 side, and to a third branching pipe 34 located on the cooling expansion valve 27 side such that it is able to switch the expelling of the heat exchange medium discharged from the external heat exchanger 24 between the gas-liquid separator 26 and the cooling expansion valve 27, and this switching action is controlled, for example, by the control unit 18.

For example, when a warming mode operation or a dehumidification warming mode operation is being executed, the three-way valve 25 expels the heat exchange medium discharged from the external heat exchanger 24 to an inflow port (not shown) of the junction pipe 33 located on the gas-liquid separator 26 side.

On the other hand, when a cooling mode operation is being executed, the three-way valve 25 expels the heat exchange medium discharged from the external heat exchanger 24 to the third branching pipe 34 located on the cooling expansion valve 27 side.

The gas-liquid separator 26 is connected between an outflow port (not shown) of the junction pipe 33 and an intake port (not shown) of the compressor 21, and separates the heat exchange medium flowing out from the outflow port of the junction pipe 33 into a gas and a liquid, and also causes the gas phase heat exchange medium to be suctioned into the compressor 21.

The cooling expansion valve 27 is what is known as a diaphragm valve, and is connected between the third branching pipe 34 and an inflow port (not shown) of the evaporated 14. In accordance with the opening angle controlled, for example, by the control unit 18, the cooling expansion valve 27 expands the heat exchange medium flowing out from the third branching pipe 34, and then expels the heat exchange medium, which is at a low temperature and low-pressure and is in a two-phase gas-liquid spray state, into the evaporator 14.

The evaporator 14 is connected between the cooling expansion valve 27 and the junction pipe 33, and is provided with an inflow port (not shown) that is connected to the third branching pipe 34, and a outflow port (not shown) that is connected to the inflow port (not shown) of the junction pipe 33.

The dehumidification electromagnetic valve 28 is provided on a second flow path 36 that branches off from the first flow path 31 by means of a fourth branching pipe 35, which is provided between the internal condenser 16 of the first flow path 31 and the first branching pipe 32a, and is connected to the third branching pipe 34, and the opening and closing actions thereof are controlled, for example, by the control unit 18. For example, when a warming mode operation or a cooling mode operation is being executed, the dehumidification electromagnetic valve 28 is set to a closed state, and when a dehumidification warming mode operation is being executed, it is set to an open state.

As a consequence, for example, when a warming mode operation or cooling mode operation is being executed, the heat exchange medium discharged from the internal condenser 16 passes through the fourth branching pipe 35 and flows only along the first flow path 31 as it travels towards the external heat exchanger 24.

In contrast, when a dehumidification warming mode operation is being executed, the heat exchange medium discharged from the internal condenser 16 is divided at the fourth branching pipe 35 between the first flow path 31 and the second flow path 36, and one portion thereof flows along the first flow path 31 heading towards the external heat exchanger 24, while the other portion thereof flows along the second flow path 36 so as to pass the dehumidification electromagnetic valve 28 and the third branching pipe 34 as it heads towards the cooling expansion valve 27.

The control unit 18 controls operations of the air conditioner for a vehicle 10 based, for example, on command signals input by an operator via suitable switches (not shown) or the like, or on the signals of detection results output from the evaporator sensor 19, and controls the switching between warming mode operations, cooling mode operations, and dehumidification warming mode operations.

The evaporator sensor 19 is placed in a position, for example, on the downstream side of the evaporator 14 inside the ventilation duct 11. The evaporator sensor 19 detects the temperature of air passing through the evaporator 14, and outputs signals showing these detection results to the control unit 18.

The air-conditioner for a vehicle 10 according to the present embodiment has the above-described structure. Next, operations of the air-conditioner for a vehicle 10 will be described.

(Warming Mode Operation)

Figure 2A:
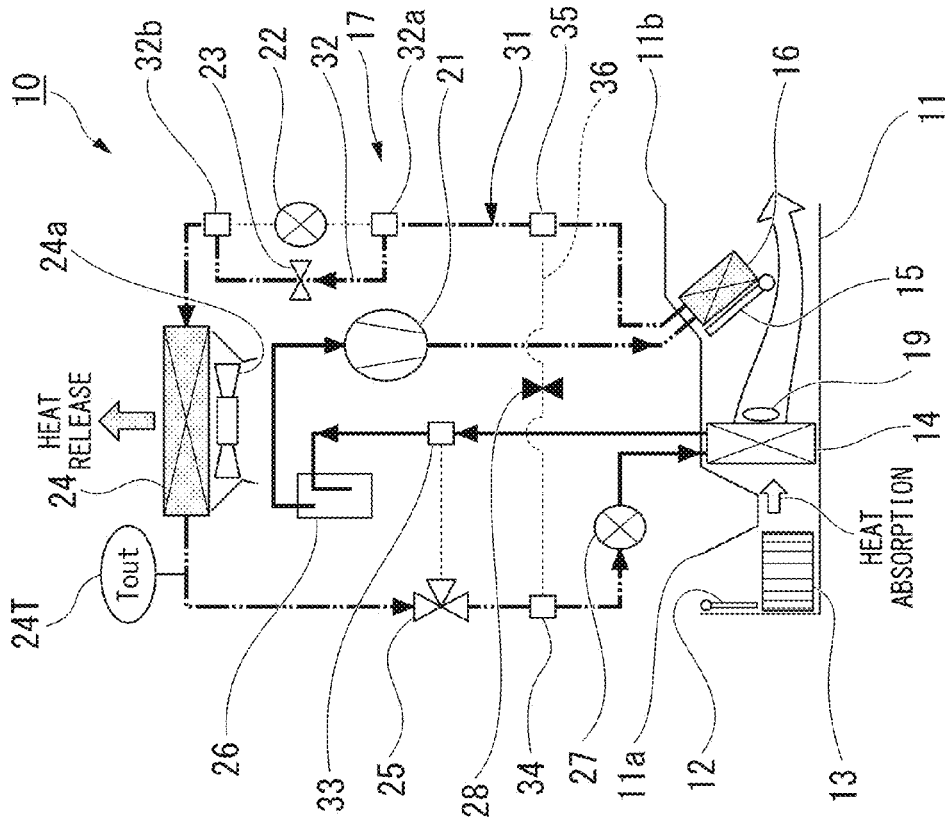
FIG. 2A is a view showing a warming mode operating state of the air conditioner for a vehicle.

Firstly, as is shown, for example, in FIG. 2A, when the air conditioner for a vehicle 10 is performing a warming mode operation, the damper 15 is set to an open state such that air that has passed through the evaporator 14 is introduced into the internal condenser 16. In addition, the cooling electromagnetic valve 23 and the dehumidification electromagnetic valve 28 are set to a closed state, and the three-way valve 25 connects the external heat exchanger 24 to the inflow port of the junction pipe 33.

As a consequence, the high-temperature, high-pressure heat exchange medium discharged from the compressor 21 heats the air inside the ventilation duct 11 using the heat released in the internal condenser 16.

In addition, the heat exchange medium is expanded by the heating expansion valve 22 so as to be placed in a two-phase gas-liquid (liquid-phase rich) spray state. It then absorbs heat from the atmosphere outside the vehicle in the external heat exchanger 24 and, while in a two-phase gas-liquid (gas-phase rich) spray state, passes through the three-way valve 25 and the junction pipe 33 and flows into the gas-liquid separator 26.

The heat exchange medium is then separated into a gas and a liquid in the gas-liquid separator 26, and the gas-phase heat exchange medium is suctioned into the compressor 21.

(Cooling Mode Operation)

Figure 2B:
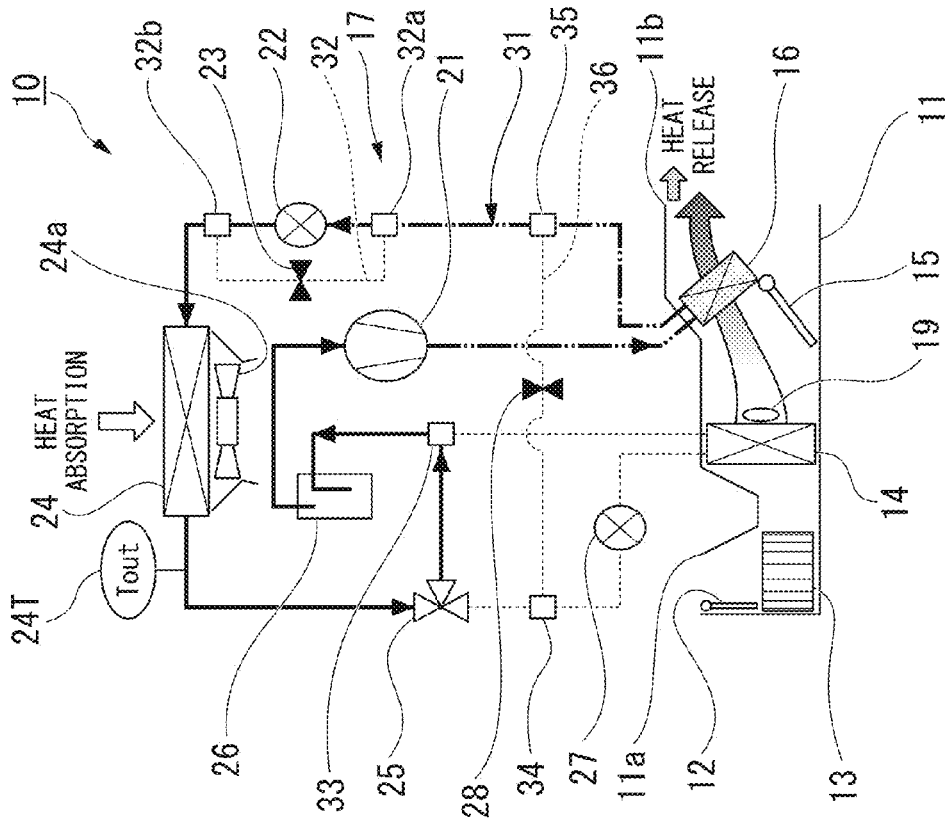
FIG. 2B is a view showing a cooling mode operating state of the air conditioner for a vehicle.

As is shown, for example, in FIG. 2B, when the air conditioner for a vehicle 10 is performing a cooling mode operation, the damper 15 is set to a closed state such that air that has passed through the evaporator 14 bypasses the internal condenser 16. In addition, the cooling electromagnetic valve 23 is set to an open state while the dehumidification electromagnetic valve 28 is set to a closed state, and the three-way valve 25 connects the external heat exchanger 24 to the third branching pipe 34.

As a result, the high-temperature, high-pressure heat exchange medium expelled from the compressor 21 passes through the internal condenser 16 and the cooling electromagnetic valve 23, and releases heat to the atmosphere outside the vehicle in the external heat exchanger 24. It then passes through the three-way valve 25 and the third branching pipe 34 and flows into the cooling expansion valve 27.

The heat exchange medium is then expanded by the cooling expansion valve 27 so that it changes to a two-phase gas-liquid (liquid-phase rich) spray state, and then cools the air inside the ventilation duct 11 due to the heat thereof being absorbed in the evaporator 14.

The two-phase gas-liquid (gas-phase rich) heat exchange medium passes through the junction pipe 33 and enters the gas-liquid separator 26. The gas is then separated from the liquid in the gas-liquid separator 26, and the gas-phase heat exchange medium is suctioned into the compressor 21.

(Dehumidification Warming Mode Operation)

Figure 3:
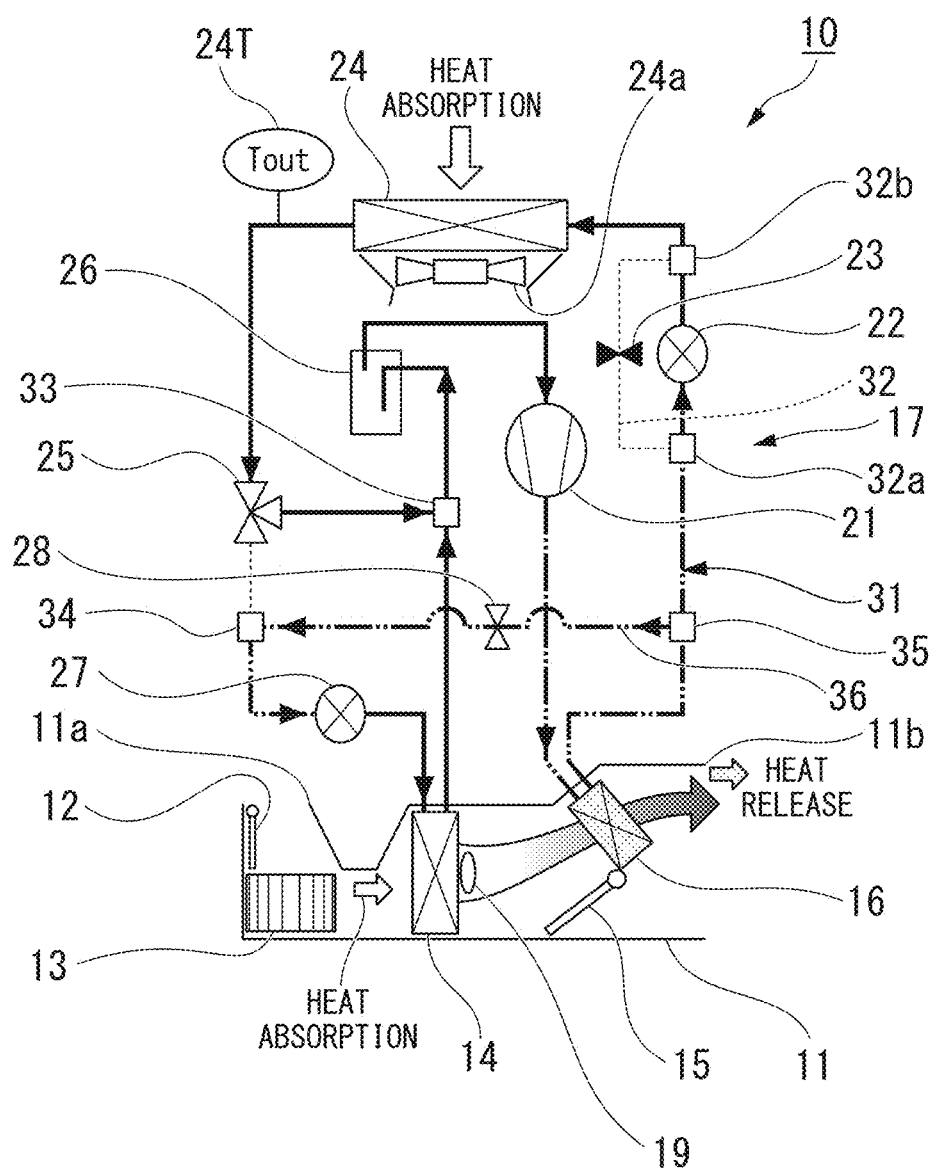
FIG. 3 is a view showing a dehumidification warming mode operating state of the air conditioner for a vehicle.

As is shown, for example, in FIG. 3, when the air conditioner for a vehicle 10 is performing a dehumidification warming mode operation, the damper 15 is set to an open state such that air that has passed through the evaporator 14 is introduced into the internal condenser 16. In addition, the cooling electromagnetic valve 23 is set to a closed state, and the dehumidification electromagnetic valve 28 is set to an open state, and the three-way valve 25 connects the external heat exchanger 24 to the inflow port of the junction pipe 33.

As a consequence, the high-temperature, high-pressure heat exchange medium expelled from the compressor 21 heats the air inside the ventilation duct 11 (namely, the air that has passed through the evaporator 14) by releasing its heat in the internal condenser 16.

The heat exchange medium is then divided at the fourth branching pipe 35 between the first flow path 31 and the second flow path 36, and one portion thereof flows along the first flow path 31 towards the external heat exchanger 24, while the other portion thereof flows along the second flow path 36 and passes the dehumidification electromagnetic valve 28 and the third branching pipe 34 as it travels towards the cooling expansion valve 27.

Namely, one portion of the heat exchange medium flows from the fourth branching pipe 35 into the heating expansion valve 22, and is expanded by the heating expansion valve 22 so as to be changed into a two-phase gas-liquid (liquid-phase rich) spray state. This portion of the heat exchange medium then absorbs heat from the atmosphere outside the vehicle in the external heat exchanger 24, and, in a two-phase gas-liquid (gas-phase rich) spray state, passes through the three-way valve 25 and the junction pipe 33 so as to flow to the gas-liquid separator 26.

Moreover, the other portion of the heat exchange medium flows from the fourth branching pipe 35 into the cooling expansion valve 27 and is expanded by the cooling expansion valve 27 so as to be changed into a two-phase gas-liquid (liquid-phase rich) spray state. This portion of the heat exchange medium uses the heat absorption of the evaporator 14 to cool the air inside the ventilation duct 11 down to dew point so as to dehumidify it, and then passes through the junction pipe 33 in a two-phase gas-liquid (gas-phase rich) state and flows into the gas-liquid separator 26.

(Defrosting Operation)

During the above-described warming mode operation of the air conditioner for a vehicle, because heat is absorbed from the outside air in the external heat exchanger 24, in some case, frost formation occurs on the external heat exchanger 24. If frost formation does occur, then because this causes the heat transfer rate of the external heat exchanger 24 to deteriorate so that the heat absorption is inadequate, the warming effect inside the vehicle compartment is insufficient. Therefore, when it is determined that frost formation has occurred on the external heat exchanger 24 during a warming mode operation, a defrosting operation is performed.

In the defrosting operation of the present embodiment, the operation switches between a defrosting cooling operation and a hot gas operation.

FIGS. 4A and 4B show defrosting operation states of an air conditioner for a vehicle. FIG. 4A shows a hot gas operation state, while FIG. 4B shows a defrosting cooling operation state.

The hot gas operation shown in FIG. 4A resembles the warming mode operation shown in FIG. 2A, however, it differs in the following points. In a warming mode operation, the heating expansion valve 22 is opened to a small aperture diameter, and the heat exchanger medium that has been compressed by the compressor 21 is expanded so that it flows into the external heat exchanger 24 and heat is absorbed therefrom by the external heat exchanger 24.

In contrast to this, in a hot gas operation, the heating expansion valve 22 is opened to a large aperture diameter, and the heat exchanger medium (i.e., the hot gas) that has been compressed by the compressor 21 is allowed to flow in an unchanged state into the external heat exchanger 24, and the heat thereof is released by the external heat exchanger 24.

When the compressor 21 is compressing the heat exchange medium, the compressor 21 itself is generating heat and that heat is transmitted to the heat exchange medium so that there is an increase in the temperature of the heat exchange medium. The heat exchange medium (i.e., the hot gas) whose temperature has increased flows into the internal condenser 16 where its heat is released and heats the air inside the ventilation duct 11. By doing this, warm air is supplied to the interior of the vehicle compartment. The heat exchange medium that has flowed out from the internal condenser 16 passes through the heating expansion valve 22 and flows into the external heat exchanger 24. In a hot gas operation, because the heating expansion valve 22 is opened to a large aperture diameter, the heat exchange medium is not expanded by the heating expansion valve 22, and flows in an unchanged state to the external heat exchanger 24.

Because this heat exchange medium releases heat without absorbing any heat in the external heat exchanger 24, the external heat exchanger 24 is able to be defrosted.

The heat exchange medium flowing out from the external heat exchanger 24 passes through the gas-liquid separator 26 and returns to the compressor 21 so as to complete a cycle.

The defrosting cooling operation shown in FIG. 4B is substantially the same as the cooling mode operation shown in FIG. 2B. In either operation, the heat exchange medium compressed by the compressor 21 flows into the external heat exchanger 24 where it releases heat, and then subsequently flows into the evaporator 14 where it absorbs heat. In this manner, in a defrosting cooling operation, because the heat exchange medium releases heat in the external heat exchanger 24, the external heat exchanger 24 is able to be defrosted.

The defrosting cooling operation and the cooling mode operation differ in the following points. In a cooling mode operation, the damper 15 is set to a closed state such that the air that is introduced into the ventilation duct 11 and passes through the evaporator 14 bypasses the internal condenser 16. In contrast to this, in a defrosting cooling operation, the damper 15 is set to an open state such that the air that has passed through the evaporator 14 also passes through the internal condenser 16.

In a defrosting cooling operation, in the same way as in a cooling mode operation, because the air inside the ventilation duct 11 is cooled via the heat absorption in the evaporator 14, compared with a warming mode operation, the temperature of the air supplied to the vehicle interior is lowered. In contrast, the heat exchange medium that has been compressed by the compressor 21 and has flowed into the internal condenser 16 releases its heat to the air passing through the internal condenser 16.

Therefore, in the defrosting cooling operation of the present embodiment, the damper 15 is set to an open state such that the air passing through the evaporator 14 also passes through the internal condenser 16. By employing this structure, because the reduction in the temperature of the air supplied to the interior of the vehicle compartment is suppressed, it is possible to alleviate any uncomfortableness felt by a vehicle occupant.

(Method of Performing a Defrosting Operation in a Air Conditioner for a Vehicle: First Embodiment)

Figure 5:
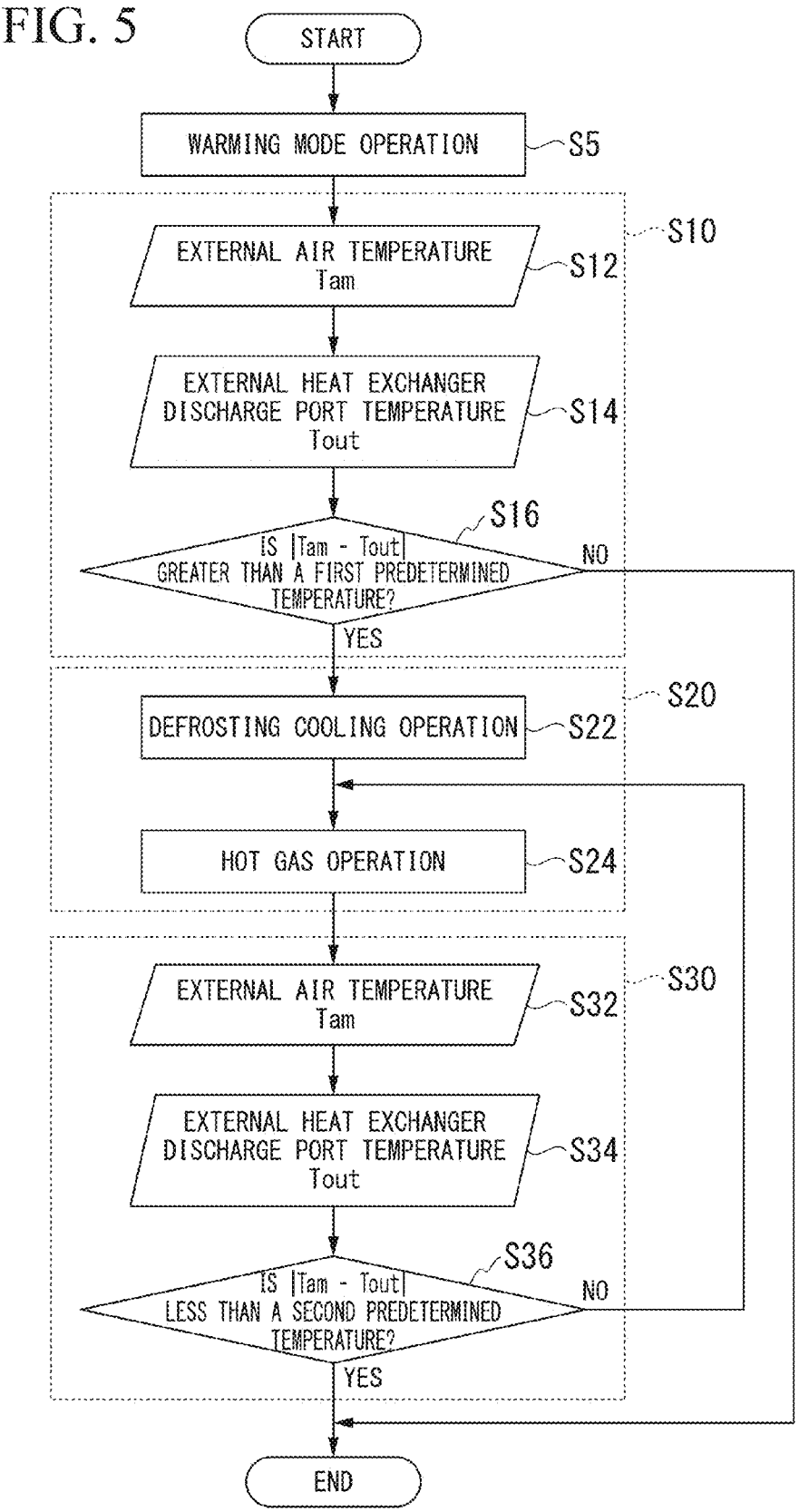
FIG. 5 is a flowchart showing a method of performing a defrosting operation in the air conditioner for a vehicle according to a first embodiment.
Figure 6:
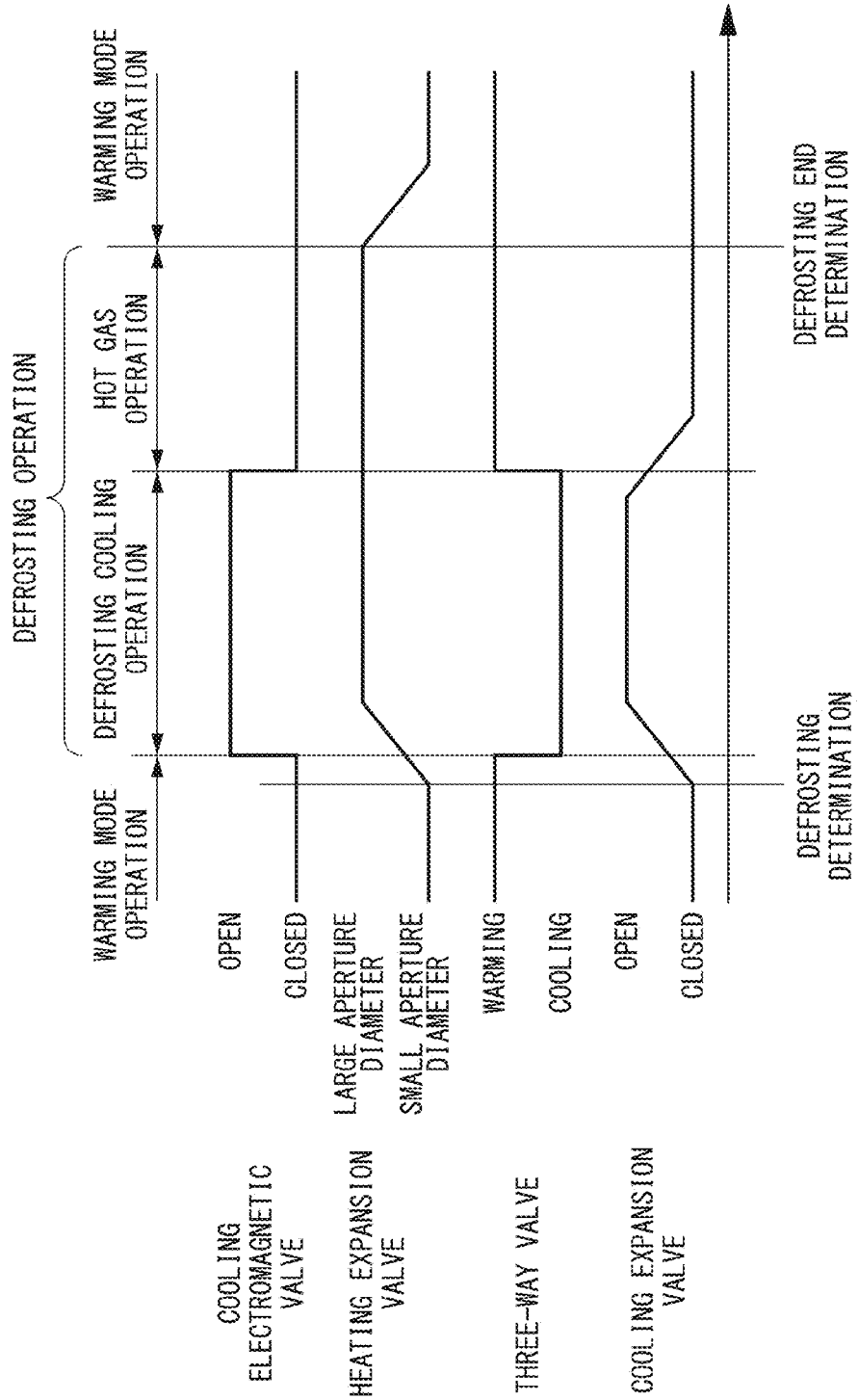
FIG. 6 is a timing chart for a method of performing a defrosting operation in the air conditioner for a vehicle according to the first embodiment.

FIG. 5 is a flowchart showing a method of performing a defrosting operation in an air conditioner for a vehicle according to a first embodiment, while FIG. 6 is a timing chart for the same. In the method of performing a defrosting operation in the air conditioner for a vehicle according to the first embodiment, the control unit 18 firstly performs a defrosting cooling operation, and then subsequently performs a hot gas operation.

The method of performing a defrosting operation of the first embodiment starts from a warming mode operation state (S5).

Next, a defrosting determination is performed in order to determine whether or not frost formation has occurred on the external heat exchanger 24 (i.e., to determine whether or not defrosting is necessary) (S10).

Specifically, the external air temperature 'Tam' is measured by an external temperature sensor (not shown), and is output to the control unit 18 (S12). In addition, the discharge port temperature 'Tout' of the external heat exchanger 24 is measured by the discharge port temperature sensor 24T, and is output to the control unit 18 (S14). The control unit 18 then determines whether an absolute value of a difference between the external air temperature 'Tam' and the discharge port temperature 'Tout' of the external heat exchanger 24 is greater than a first predetermined temperature (S16).

In a warming mode operation, heat absorption is performed by the external heat exchanger 24. Here, if frost has formed on the external heat exchanger 24, then because the heat transfer rate of the external heat exchanger 24 will have deteriorated, the heat exchange medium will no longer be able to absorb sufficient heat from the outside air. In this case, the temperature difference between the discharge port temperature 'Tout' and the external air temperature 'Tam' is increased without the discharge port temperature 'Tout' of the external heat exchanger 24 rising to a temperature close to that of the external air temperature 'Tam'.

Therefore, if an absolute value of the difference between the external air temperature 'Tam' and the discharge port temperature 'Tout' of the external heat exchanger 24 is greater than a first predetermined temperature (i.e., if the determination in S16 is Yes), then frost is determined to have formed on the external heat exchanger 24. On the other hand, if the determination in S16 is No, frost is determined to have not formed on the external heat exchanger 24, and because defrosting is not required, the routine is ended. Note that the flowchart shown in FIG. 5 is repeatedly performed during a warming mode operation.

If the determination in S16 is Yes, a defrosting operation is performed (S20). In the first embodiment, firstly, a defrosting cooling operation is performed (S22).

Specifically, as is shown in FIG. 6, when a defrosting determination has been established (i.e., when the determination in S16 is Yes), the task of increasing the aperture angle of the heating expansion valve 22 from a small aperture diameter to a large aperture diameter is started. Moreover, the task of increasing the aperture angle of the cooling expansion valve 27 from a closed state to an open state is also started. Next, while the aperture angles of the heating expansion valve 22 and the cooling expansion valve 27 are being increased, the cooling electromagnetic valve 23 is switched from a closed state to an open state. In addition, the outflow port of the three-way valve 25 is switched from the warming side (i.e., the junction pipe 33 side) to the cooling side (i.e., the third branching pipe 34 side).

As a result, the heat exchange medium that has been compressed by the compressor 21 flows into the external heat exchanger 24 without being expanded in the heating expansion valve 22. As a result, because the heat of the heat exchange medium is released in the external heat exchanger 24, a defrosting cooling operation is started.

Note that, by starting to increase the aperture angles of the heating expansion valve 22 and the cooling expansion valve 27 prior to performing the switching of the cooling electromagnetic valve 23 and the three-way valve 25, even if a prolonged length of time is needed to increase the aperture angles of the two, it is still possible to quickly start a dehumidification cooling operation. Note that this defrosting cooling operation is performed for a predetermined length of time.

Next, a hot gas operation is performed (S24).

Specifically, as is shown in FIG. 6, immediately prior to the defrosting cooling operation having been performed for a predetermined length of time, the task of reducing the aperture angle of the cooling expansion valve 27 from an open state to a closed state is started. Next, while the aperture angle of the cooling expansion valve 27 is being reduced, the cooling electromagnetic valve 23 is switched from an open state to a closed state. In addition, the outflow aperture of the three-way valve 25 is switched from the cooling side (i.e., the third branching pipe 34 side) to the warming side (i.e., the junction pipe 33 side). As a result, the heat exchange medium that has flowed out from the external heat exchanger 24 bypasses the evaporator 14 and flows into the compressor 21 where a hot gas operation is started.

Note that because the heat exchange medium is compressed by the compressor 21 to a suitable pressure by performing a hot gas operation by closing the cooling electromagnetic valve 23 and opening only the heating expansion valve 22 to a large aperture diameter, hot gas can be efficiently generated.

Next, a defrosting end determination is performed (S30). Specifically, in the same way as the defrosting determination, the external air temperature 'Tam' is measured by an external temperature sensor (not shown), and is output to the control unit 18 (S32). In addition, the discharge port temperature 'Tout' of the external heat exchanger 24 is measured by the discharge port temperature sensor 24T, and is output to the control unit 18 (S34). The control unit 18 then determines whether or not an absolute value of the differential between the external air temperature 'Tam' and the discharge port temperature 'Tout' of the external heat exchanger 24 is less than a second predetermined temperature (S36).

Note that by setting the second predetermined temperature for the defrosting end determination to a smaller value than the first predetermined temperature for the defrosting determination, it is possible to prevent the defrosting operation being performed intermittently for short time periods. If the result of the determination in step S36 is No, the defrosting is determined to have not yet ended, and the routine consequently returns to S24 and the hot gas operation is continued.

If the frost on the external heat exchanger 24 has melted, then the heat transfer rate of the external heat exchanger 24 has improved and the release of heat from the heat exchange medium to the outside air is being performed satisfactorily. As a result, the discharge port temperature 'Tout' of the external heat exchanger 24 approaches the external air temperature 'Tam', and the difference between the two temperatures is decreased.

Therefore, if the absolute value of the differential between the external air temperature 'Tam' and the discharge port temperature 'Tout' of the external heat exchanger 24 is less than the second predetermined temperature (i.e., if the determination in S36 is Yes), then defrosting of the external heat exchanger 24 is determined to have ended. In this case, as is shown in FIG. 6, the aperture angle of the heating expansion valve 22 is decreased from a large aperture diameter to a small aperture diameter, and the hot gas operation is ended.

As a result of the above process, the defrosting operation of the air conditioner for a vehicle of the first embodiment is ended and the operation reverts to a warming mode operation.

As has been described above in detail, in a defrosting operation for the air conditioner for a vehicle of the first embodiment, a structure in which the air conditioner for a vehicle switches between a defrosting cooling operation in which heat is absorbed by the evaporator 14, and a hot gas operation in which heat is not absorbed by the evaporator 14 is employed.

By employing this structure, compared with when a defrosting operation is performed solely via a cooling operation, it is possible to prevent cold air being blown into the vehicle compartment interior. Moreover, in a defrosting cooling operation in which heat is first absorbed and then released, compared with a hot gas operation in which heat is released without having been absorbed first, a greater quantity of heat can be released. As a result of this, compared with when a defrosting operation is performed solely via a hot gas operation, the defrosting of the external heat conditioner can be performed efficiently and in a short space of time.

In a warming mode operation, because the heat exchange medium is expanded by the heating expansion valve 22, the heat exchange medium enters a two-phase gas-liquid state, and the liquid-phase heat exchange medium is separated out in the gas-liquid separator 26. In contrast, in a hot gas operation, because the heat exchange medium is not expanded by the heating expansion valve 22, it is able to flow as it is in a gas-phase state.

Here, immediately after the operation has switched from a warming mode operation to a hot gas operation, because there is residual liquid-phase heat exchange medium left in the gas-liquid separator 26, the flow quantity of the gas-phase heat exchange medium is in a temporarily reduced state until the liquid-phase heat exchange medium is vaporized. In this state, it is difficult to create hot gas by compressing the heat exchange medium to a suitable degree using the compressor 21.

Because of this, when a defrosting operation is performed solely via a hot gas operation, a prolonged length of time is needed until the frost begins to melt, and the problem arises that the power consumed by the compressor increases.

In contrast to this, in the defrosting operation of an air conditioner for a vehicle according to the first embodiment, a structure is employed in which a defrosting cooling operation is performed first, and a hot gas operation is performed next.

According to this structure, it is possible to begin to melt the frost at an early stage by performing a defrosting cooling operation first. As a consequence, compared with when a defrosting operation is performed solely via a hot gas operation, the length of time needed for the defrosting operation is shortened and the amount of power consumed by the compressor can be kept in check. Note that cold air is supplied to the vehicle compartment interior during a defrosting cooling operation, however, because the operation switches to a hot gas operation and the defrosting continues before the vehicle occupant feels any cold, it is possible to alleviate any feeling of discomfort experienced by a vehicle occupant that may arise from a defrosting operation.

(Method of Performing a Defrosting Operation in an Air Conditioner for a Vehicle: Second Embodiment)

Figure 7:
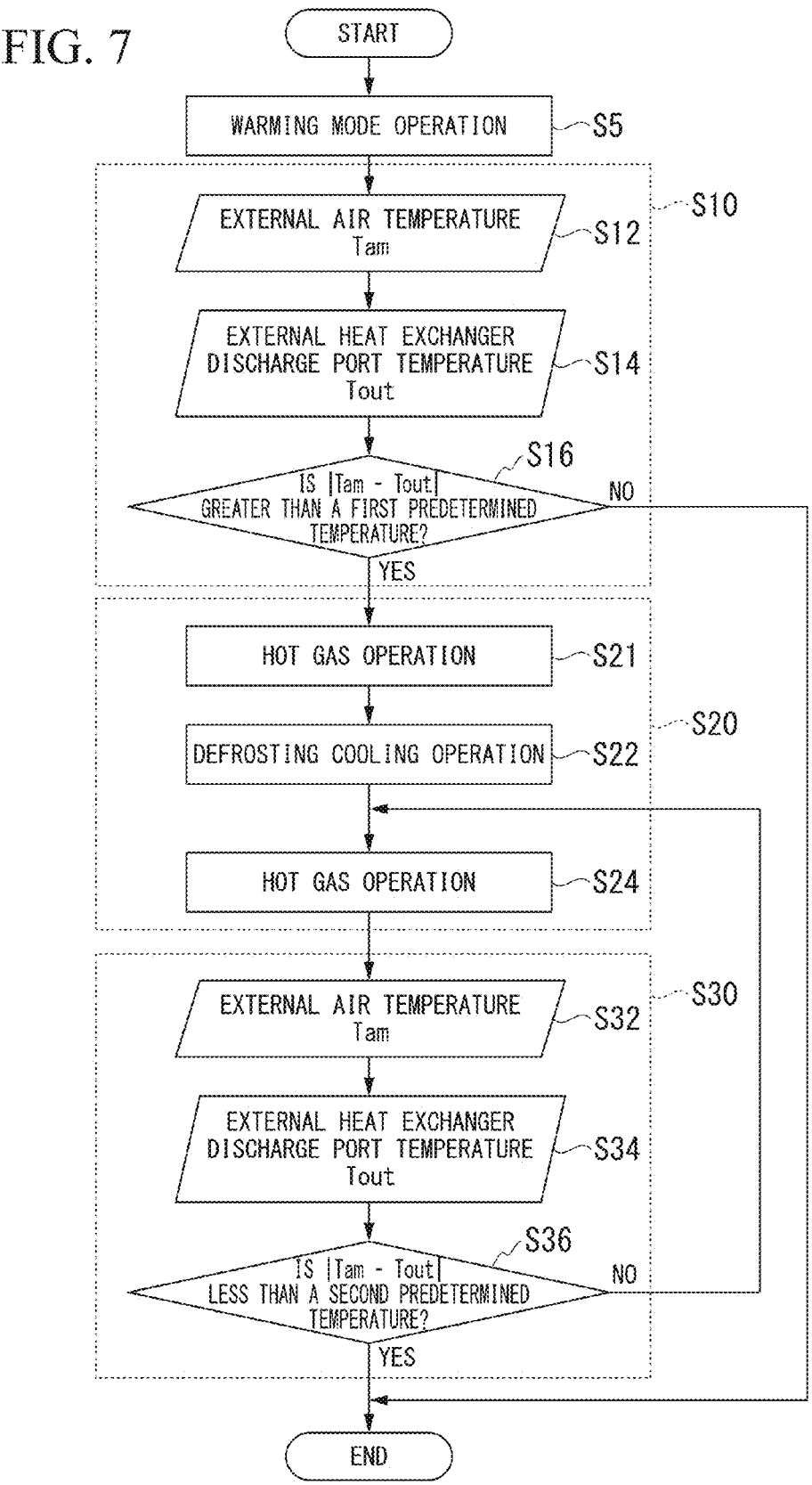
FIG. 7 is a flowchart showing a method of performing a defrosting operation in the air conditioner for a vehicle according to a second embodiment.
Figure 8:
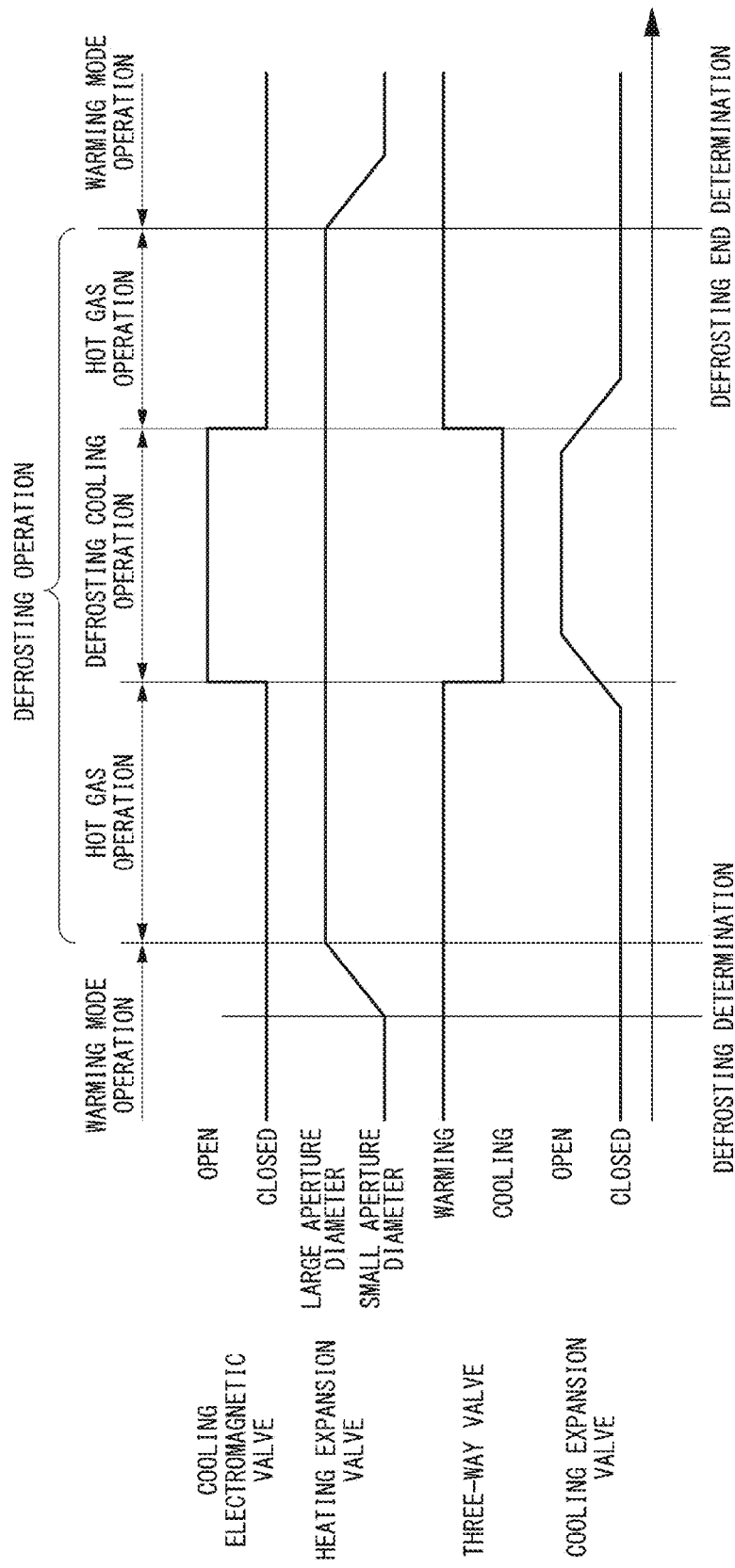
FIG. 8 is a timing chart for a method of performing a defrosting operation in the air conditioner for a vehicle according to the second embodiment.

FIG. 7 is a flowchart showing a method of performing a defrosting operation in an air conditioner for a vehicle according to a second embodiment, while FIG. 8 is a timing chart for the same. In the method of performing a defrosting operation in the air conditioner for a vehicle according to the second embodiment, the control unit 18 firstly performs a hot gas operation, and then performs a defrosting cooling operation, and then subsequently performs a hot gas operation once again. Note that no description is given of portions that have the same structure as in the first embodiment.

In the same way as in the first embodiment, this routine starts from a warming mode operation state (S5), and then a defrosting determination is performed in order to determine whether or not frost formation has occurred on the external heat exchanger 24 (i.e., to determine whether or not defrosting is necessary) (S10).

When it is determined in S10 that defrosting is necessary, the defrosting operation is performed (S20). In the second embodiment, firstly a hot gas operation is performed (S21).

Specifically, as is shown in FIG. 8, when a defrosting determination has been established (i.e., when the determination in S16 is Yes), the aperture angle of the heating expansion valve 22 is increased from a small aperture diameter to a large aperture diameter. As a consequence, the heat exchange medium that was compressed by the compressor 21 flows into the external heat exchanger 24 without being expanded by the heating expansion valve 22. As a result of this, because the heat exchange medium releases its heat in the external heat exchanger 24, defrosting by means of a hot gas operation is started. Note that the first hot gas operation is performed for a predetermined length of time.

Next, a defrosting cooling operation is performed (S22). Specifically, as is shown in FIG. 8, the aperture angle of the heating expansion valve 22 is held at a large aperture diameter. Immediately before a predetermined length of time of the hot gas operation has elapsed, the task of increasing the aperture angle of the cooling expansion valve 27 from a closed state to an open state is started. The remaining structure is the same as in the first embodiment. The defrosting cooling operation is also performed for a predetermined length of time.

Next, the second hot gas operation is performed (S24). The structure of the second hot gas operation is the same as in the first embodiment.

Next, a defrosting end determination is made (S30). The structure of this defrosting end determination is the same as in the first embodiment.

As a result of the above, the defrosting operation of an air conditioner for a vehicle according to the second embodiment is ended.

In this manner, in the defrosting operation of an air conditioner for a vehicle according to the second embodiment, a structure is employed in which, firstly, a hot gas operation is performed, secondly, a defrosting cooling operation is performed, and, finally, a hot gas operation is performed once again.

According to this structure, by performing a first hot gas operation, defrosting preparations can be made without lowering the temperature of the air that is supplied to the vehicle compartment interior. As a consequence, because a portion of the frost is melted, the time taken by the subsequent defrosting cooling operation can be shortened, so that the length of time that cold air is supplied to the vehicle compartment interior can also be shortened. In addition, because the operation is restored to a warming mode operation via the second hot gas operation, the transition from a defrosting operation to a warming mode operation can be made smoothly.

Note that in the defrosting operation of the first embodiment, firstly, a defrosting cooling operation was performed, and then a hot gas operation was performed prior to the operation returning to a warming mode operation, however, it is also possible to first perform the hot gas operation, and to then perform the defrosting cooling operation prior to returning to a warming mode operation.

Moreover, in each of the above-described embodiments, the defrosting determination and the defrosting end determination are made by comparing the discharge port temperature of the external heat exchanger with the external air temperature, however, the defrosting determination and the defrosting end determination may also be made by means of another method.

Moreover, instead of making the defrosting end determination (i.e., the final hot gas operation ending determination) via the above-described method, it is also possible to simply perform the final hot gas operation for a predetermined length of time. In this case, the overall frosting operation is performed for a predetermined length of time. This defrosting operation time can be decided in accordance with the differential between the discharge port temperature of the external heat exchanger and the external air temperature at the point when a determination to start a defrosting operation is made.

Moreover, in each of the above-described embodiments, the modification to the aperture angle of the heating expansion valve 22 or the cooling expansion valve 27 is started prior to the switching of the cooling electromagnetic valve 23 or the three-way valve 25, however, it is also possible to start the modification to the aperture angle of the heating expansion valve 22 or cooling expansion valve 27 at the same time as the switching of the cooling electromagnetic valve 23 or three-way valve 25 is being performed.

Moreover, in some cases a button (i.e., an ECON button) that is used to switch between a normal operating mode and an energy saver operating mode may be provided in the air conditioner for a vehicle. In this case, in each operating mode, the ratios of the operating times for the hot gas operation and the defrosting cooling operation during a defrosting operation may be set to different settings.

For example, if priority is to be given to the comfort of a vehicle occupant in the normal operating mode, the operating time ratio can be set so that the hot gas operation is given precedence, while if priority is to be given to reducing energy consumption in the energy saver operating mode, the operating time ratio can be set so that the defrosting cooling operation is given precedence.

Hereinafter, an air conditioner for a vehicle according to another embodiment of the present invention will be described with reference made to the attached drawings (FIG. 9 through FIG. 14). In the following description, component elements that are identical to or similar to those of the above-described embodiments are given the same descriptive symbols and any description thereof is either simplified or omitted.

Figure 9:
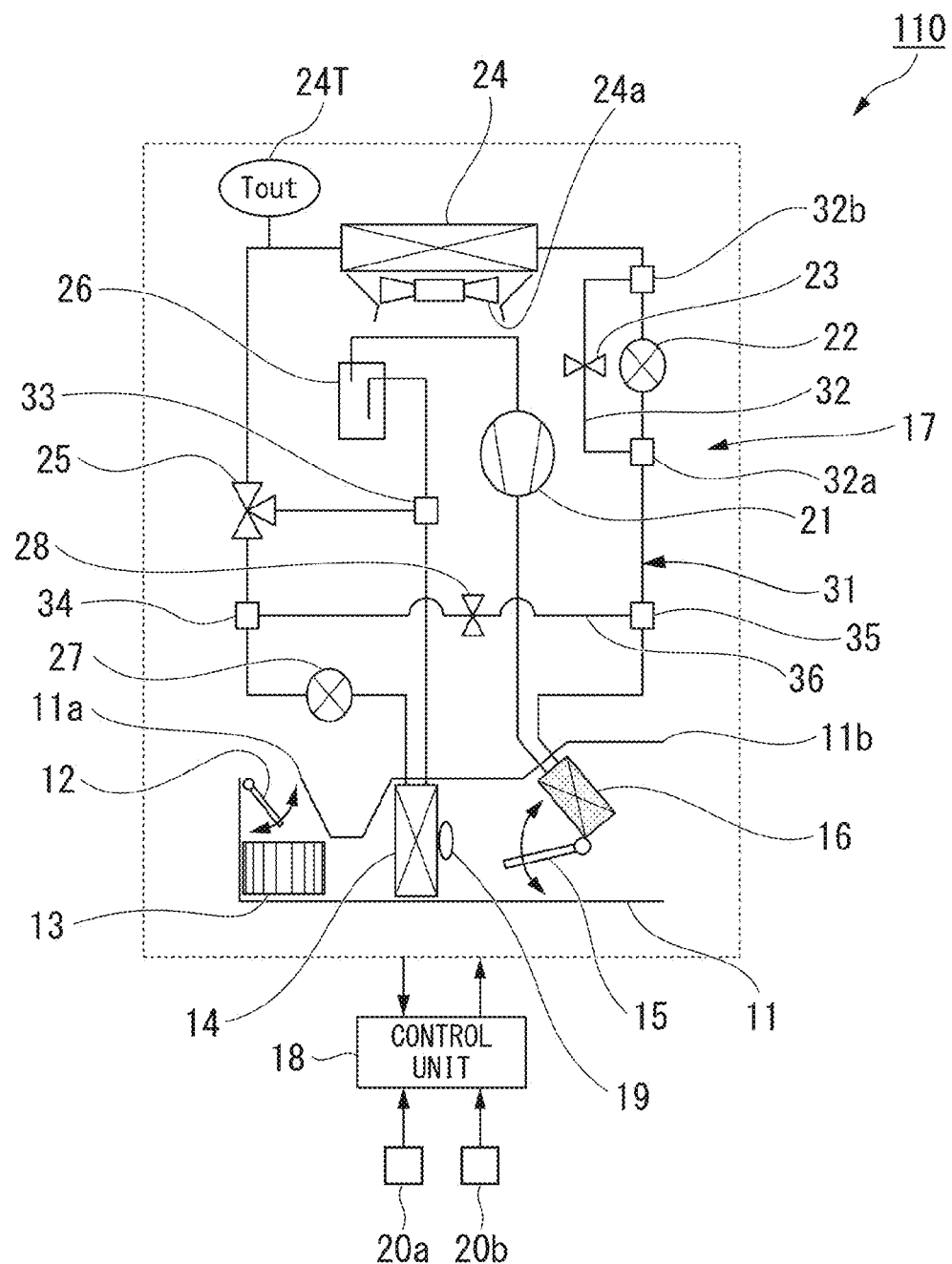
FIG. 9 is a structural view of an air conditioner for a vehicle according to another embodiment of the present invention.
Figure 10A:
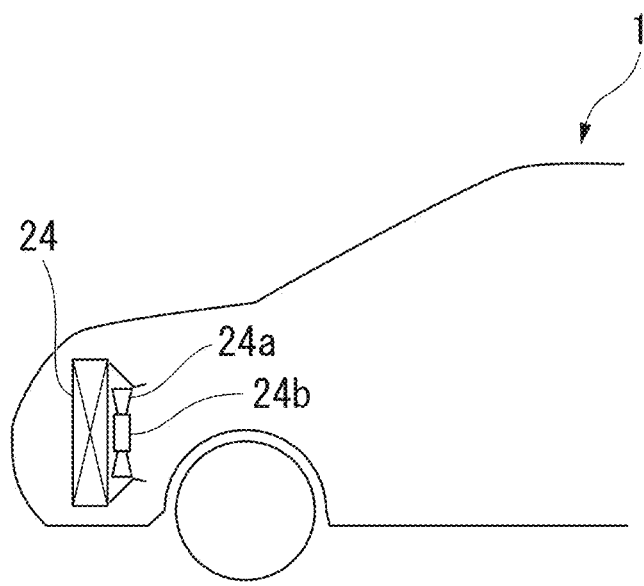
FIG. 10A is a view showing an example of the placement of an external heat exchanger of an air conditioner for a vehicle.
Figure 10B:
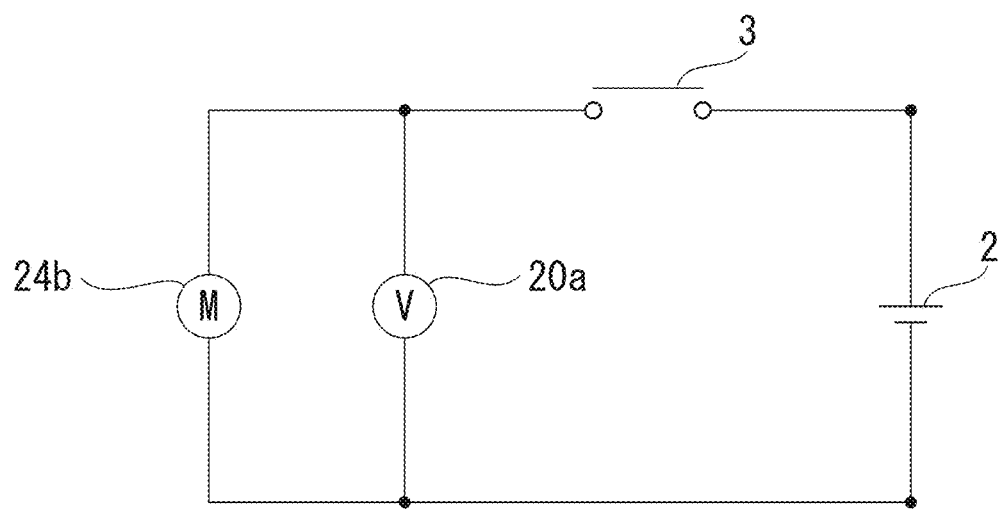
FIG. 10B is a structural view showing connections between a fan motor and a power supply of an external heat exchanger of an air conditioner for a vehicle.

FIG. 9 shows the structure of an air conditioner for a vehicle 110 according to the present embodiment. The air conditioner for a vehicle 110 is further provided with an electromotive force sensor 20a and a vehicle speed sensor 20b in addition to the component elements of the air conditioner for a vehicle 10 shown in FIG. 1. Note that the air conditioner for a vehicle 110 differs from the air conditioner for a vehicle 10 in that the electromotive force sensor 20a and the vehicle speed sensor 20b are provided, however, because the remaining structure is the same as that of the air conditioner for a vehicle 10 no description thereof will be given.

The control unit 18 controls operations of the air conditioner for a vehicle 110 based, for example, on command signals input by an operator via suitable switches (not shown) or the like, or on the signals of detection results output from the evaporator sensor 19, the electromotive force sensor 20a and the vehicle speed sensor 20b and controls the switching between warming mode operations, cooling mode operations, dehumidification warming mode operations, and defrosting mode operations. As is shown in, for example, FIG. 10A and FIG. 10B, the electromotive force sensor 20a detects a voltage between terminals of a fan motor 24b (i.e., a fan motor voltage, namely, the applied voltage when the fan motor is being driven and the electromotive force during regeneration) that is capable of driving a condenser fan 24a of the external heat exchanger 24 that is located in the front portion of the electric vehicle 1, and outputs a signal containing detection results to the control unit 18.

Note that the condenser fan 24a may be located, for example, rearward of the external heat exchanger 24 in the longitudinal direction of the vehicle, and the fan motor 24b can be driven by power supplied from a power supply 2 such as a battery or the like that is mounted, for example, in the electric vehicle 1.

As a result of the above, when the fan motor 24b is being driven in accordance with power supplied from the power supply 2, the condenser fan 24a is able to blow air to the external heat exchanger 24 from the rearward side towards the forward side.

Moreover, the condenser fan 24a is able to be driven to rotate, for example, by receiving the wind that travels through the external heat exchanger 24 from the forward side towards the rearward side and that is caused by the traveling wind that is generated when the electric vehicle 1 is running. The fan motor 24b generates (i.e., regenerates) power as a result of the drive force from the condenser fan 24a being transmitted thereto when, for example, the power supply from the power supply 2 has been interrupted, and is thereby able to generate electromotive force.

As a result of the above, when the power supply from the power supply 2 has been interrupted and the fan motor 24b is regenerating power, the condenser fan 24a is able to generate electromotive force using the traveling wind.

As a consequence, a switch 3 that is able to interrupt a connection is provided between the fan motor 24b and the power supply 2, and connections and disconnections (i.e., interruptions) of this switch 3 are controlled by the control unit 18.

The vehicle speed sensor 20b detects the speed (i.e., the vehicle speed) based, for example, on the wheel speed and the like of the electric vehicle 1, and outputs signals containing the detection results to the control unit 18.

The air conditioner for a vehicle 110 of the present embodiment has the above-described structure. Next, an operation of the air conditioner for a vehicle 110 will be described. Note that because the warming mode operation, cooling mode operation, and dehumidification warming mode operation of the air conditioner for a vehicle 110 are similar to those of the air conditioner for a vehicle 10, any description thereof is omitted at this time.

(Defrosting Mode Operation)

During a warming mode operation of the air conditioner for a vehicle 110, because heat from the outside atmosphere is absorbed by the external heat exchanger 24, there are cases when frost formation occurs on the external heat exchanger 24. If frost formation does occur, then because the heat transfer rate of the external heat exchanger 24 deteriorates so that the heat absorption is inadequate, the problem arises that the warming effect inside the vehicle compartment is insufficient.

Therefore, when it is determined that frost has formed on the external heat exchanger 24 during a warming mode operation, a defrosting mode operation is performed.

A defrosting mode operation is a defrosting cooling operation, or a hot gas operation, or a switching operation that switches between a defrosting cooling operation and a hot gas operation alternatingly in an appropriate sequence.

Note that because the defrosting cooling operation and hot gas operation states are the same in both the air conditioner for a vehicle 10 and the air conditioner for a vehicle 110, no description thereof is given here.

Hereinafter, the processing to switch between executing and terminating the defrosting mode operation performed by the air conditioner for a vehicle 110 will be described.

Note that the processing of steps S01 through S09 described below is repeatedly executed, for example, at the timings of a predetermined cycle or the like.

Figure 11:
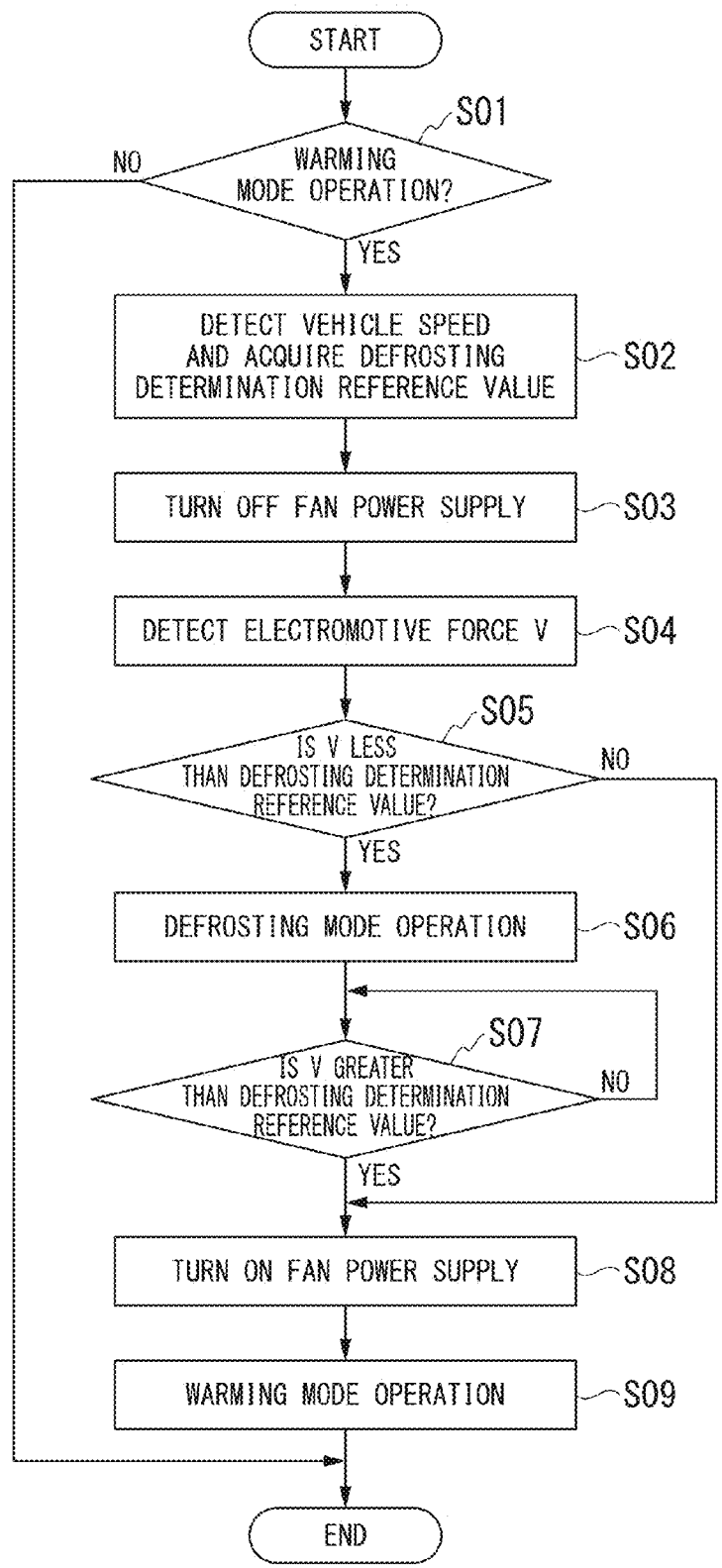
FIG. 11 is a flowchart showing an operation of the air conditioner for a vehicle according to another embodiment of the present invention.

Firstly, in step S01 shown, for example, in FIG. 11, a determination is made as to whether or not a warming mode operation is currently being executed.

If the result of this determination is [NO], the routine moves to the end.

If, on the other hand, the result of this determination is [YES], the routine moves to step S02.

Next, in step S02, the vehicle speed of the electric vehicle 1 is detected, and based on this detection result, a reference is made to predetermined data that has already been stored, and a defrosting determination reference value for the electromotive force V of the fan motor 24b is acquired.

Figure 12:
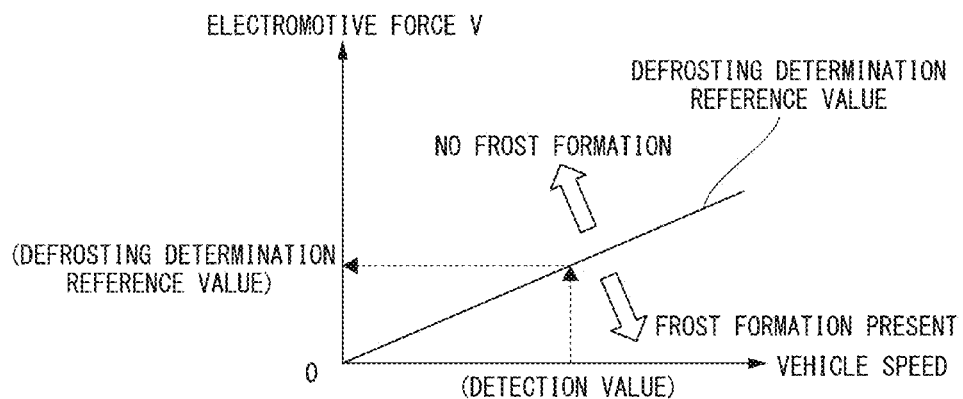
FIG. 12 is a graph showing an example of defrosting determination reference values of the air conditioner for a vehicle according to another embodiment of the present invention.

Note that, as is shown, for example, in FIG. 12, this predetermined data that has already been stored is data showing correlations between the vehicle speed of the electric vehicle 1 and the defrosting determination reference value.

The defrosting determination reference value is, for example, a determination threshold value that, when a traveling wind, whose strength corresponds to the vehicle speed of the electric vehicle 1, is passing through the external heat exchanger 24 and driving the condenser fan 24a to rotate, is set for the electromotive force generated by the power generation (i.e., regeneration) of the fan motor 24b to which the supply of power has been stopped.

For example, in the predetermined data shown in FIG. 12, as the vehicle speed increases, the defrosting determination reference value is set such that it changes on a constantly increasing trend.

If the electromotive force V that is actually generated in the fan motor 24b is less than a defrosting determination reference value that has been assigned to a suitable detection value for the vehicle speed, then it is determined that, because frost formation has occurred on the external heat exchanger 24, the extent to which the speed of the wind passing through the external heat exchanger 24 has been reduced is greater than a predetermined tolerance.

If, on the other hand, the electromotive force V that is actually generated in the fan motor 24b is greater than the defrosting determination reference value, then it is determined that frost formation has not occurred on the external heat exchanger 24, or that even if frost formation has occurred on the external heat exchanger 24, the extent of the reduction in the speed of the wind passing through the external heat exchanger 24 is within the predetermined tolerance.

Next, in step S03, the switch 3 is switched from connected to disconnected (i.e., interrupted), and the power supply from the power supply 2 to the fan motor 24b is shut off (i.e., fan power supply OFF).

Next, in step S04, the electromotive force V of the fan motor 24b when the supply of power thereto has been stopped is detected.

Next, in step S05, a determination is made as to whether or not the detected electromotive force V is less than the defrosting determination reference value that corresponds to the detected vehicle speed.

If the result of this determination is [NO], the routine moves to step S08 (described below).

If, however, the result of this determination is [YES], the routine moves to step S06.

In step S06, the execution of the defrosting mode operation is started.

In step S07, the electromotive force V of the fan motor 24b which is no longer being supplied with power is detected, and a determination is made as to whether or not the detected electromotive force V is greater than the defrosting determination reference value that corresponds to the detected vehicle speed.

If the result of this determination is [NO], the determination of the above-described step S07 is repeated.

If, however, the result of this determination is [YES], the routine moves to step S08.

Next, in step S08, the defrosting mode operation is stopped and the switch 3 is switched from disconnected (i.e., interrupted) to connected so that power is supplied from the power supply 2 to the fan motor 24b (i.e., the fan power supply is ON).

Next, in step S09, the warming mode operation is restarted and the routine moves to its end.

Figure 13:
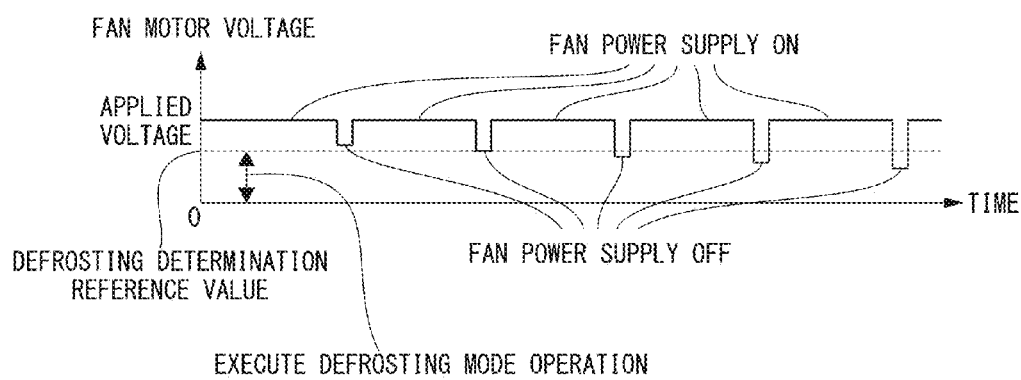
FIG. 13 is a view showing an example of changes when a fan power supply is turned on and off, and in the electromotive force of the air conditioner for a vehicle according to another embodiment of the present invention.

As a result of the above, for example, as is shown in FIG. 13, when a warming mode operation is being executed, fan power supply ON and fan power supply OFF are alternatingly repeated, and the electromotive force V when the fan power supply is OFF is detected by the electromotive force sensor 20a.

When the detected electromotive force V is less than the defrosting determination reference value that corresponds to the vehicle speed at this time, the execution of the defrosting mode operation is started.

For example, as is shown in FIG. 14, when the fan power supply is switched from ON to OFF at the timing t1, the electromotive force V that is detected by the electromotive force sensor 20a changes to a gradually decreasing trend from the predetermined applied voltage that is applied to the fan motor 24b by the power supply 2.

If, for example, frost formation has not occurred on the external heat exchanger 24, or even if frost formation has occurred on the external heat exchanger 24 but the extent of the reduction in the speed of the wind passing through the external heat exchanger 24 is within the predetermined tolerance, then the detected electromotive force V is the equivalent to the electromotive force of the condenser fan 24a that is created by a traveling wind whose strength corresponds to the vehicle speed at this time. In this case, the fan power supply is switched from OFF to ON at a suitable timing (for example, at the timing t3 or the like) without the defrosting mode operation being executed, and the warming mode operation is restarted.

If, on the other hand, for example, due to the occurrence of frost formation on the external heat exchanger 24, the extent to which the speed of the wind passing through the external heat exchanger 24 has been reduced is greater than the predetermined tolerance, then the detected electromotive force V is smaller than the electromotive force that is created by a traveling wind whose strength corresponds to the vehicle speed at this time.

In addition, for example, at the timing t2 and thereafter, if the detected electromotive force V drops to less than a defrosting determination reference value that corresponds to the vehicle speed at this time, the execution of the defrosting mode operation is started.

Furthermore, for example, at the timing t3 while the defrosting mode operation is still being executed, if the detected electromotive force V becomes larger than a defrosting determination reference value that corresponds to the vehicle speed at this time, the defrosting mode operation is stopped, the fan power supply is switched from OFF to ON, and a warming mode operation is restarted.

As is described above, according to the air conditioner for a vehicle 110 of the present embodiment, it is possible to detect the extent of the reduction in speed of the wind passing through the external heat exchanger 24 by comparing the electromotive force of the condenser fan 24a that corresponds to a previously ascertained vehicle speed with the electromotive force V actually generated in the condenser fan 24a.

By then determining whether or not frost formation has occurred on the external heat exchanger 24 in accordance with these detection results, and then starting the execution of a defrosting mode operation if it is determined that frost formation has occurred, a defrosting operation can be executed at suitable timings and at a suitable frequency.

As a result of this, if, in actual fact, frost has not formed on the external heat exchanger 24, or if frost has formed on the external heat stranger 24 but this frost has had no effect on the performance of the external heat exchanger 24, then it is possible to prevent a defrosting mode operation being executed excessively frequently.

Furthermore, while a defrosting mode operation is actually being executed, by comparing the electromotive force of the condenser fan 24a that corresponds to a previously ascertained vehicle speed to the electromotive force V that is actually generated in the condenser fan 24a when the power supply thereto has been stopped, it is possible to detect whether or not the speed of the wind passing through the external heat exchanger 24 that has decreased due to frost formation has recovered.

By determining whether or not frost formation has occurred on the external heat exchanger 24 in accordance with this detection result, and then stopping the defrosting mode operation when it is determined that frost formation has not occurred, it is possible to stop the defrosting mode operation at a suitable timing.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as limited by the foregoing description and is only limited by the scope of the appended claims.

What is claimed is:

1. An air conditioner for a vehicle, comprising:
a compressor that compresses a heat exchange medium;
an external heat exchanger that receives the heat exchange medium and that exchanges heat with the outside of a vehicle compartment; and
an internal heat exchanger that receives the heat exchange medium and exchanges heat with the inside of a vehicle compartment;
a controller that controls the air conditioner for a vehicle; and
a damper that adjusts an air volume that is introduced into an internal condenser,
wherein
the controller is configured to control the air conditioner to perform:
a defrosting cooling operation in which the damper is opened and the heat exchange medium that has been compressed by the compressor is made to flow into the internal condenser, then to flow into the external heat exchanger to release heat, and then to flow into the internal heat exchanger to absorb heat; and
a hot gas operation in which the heat exchange medium that has been compressed by the compressor is made to flow into the internal condenser and then to flow into the external heat exchanger to release heat, and wherein the air conditioner for a vehicle performs a defrosting operation in which the defrosting cooling operation and the hot gas operation are alternately performed to thereby defrost the external heat exchanger.

\* \* \* \* \*